United States Patent
Rangasamy et al.

(10) Patent No.: US 12,051,810 B2
(45) Date of Patent: Jul. 30, 2024

(54) PROTECTION INTERFACES FOR Li-ion BATTERY ANODES

(71) Applicant: Applied Materials, Inc., Santa Clara, CA (US)

(72) Inventors: Ezhiylmurugan Rangasamy, Oakland, CA (US); Subramanya P. Herle, Mountain View, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 17/863,106

(22) Filed: Jul. 12, 2022

(65) Prior Publication Data
US 2022/0352520 A1 Nov. 3, 2022

Related U.S. Application Data

(62) Division of application No. 16/777,653, filed on Jan. 30, 2020, now Pat. No. 11,424,454.
(Continued)

(51) Int. Cl.
*H01M 4/62* (2006.01)
*H01M 4/04* (2006.01)
(Continued)

(52) U.S. Cl.
CPC ......... *H01M 4/628* (2013.01); *H01M 4/0404* (2013.01); *H01M 4/134* (2013.01);
(Continued)

(58) Field of Classification Search
None
See application file for complete search history.

(56) References Cited

U.S. PATENT DOCUMENTS

| | | |
|---|---|---|
| 4,337,239 A | 6/1982 | Ruhs et al. |
| 7,282,296 B2 | 10/2007 | Visco et al. |

(Continued)

FOREIGN PATENT DOCUMENTS

| | | |
|---|---|---|
| CN | 1511351 A | 7/2004 |
| CN | 1585163 A | 2/2005 |

(Continued)

OTHER PUBLICATIONS

English translation of CN 109830690 (Year: 2019).*
(Continued)

*Primary Examiner* — Yoshitoshi Takeuchi
(74) *Attorney, Agent, or Firm* — Patterson + Sheridan, LLP

(57) ABSTRACT

Interfacial films, which are both electronic conducting and ion conducting, for anode films are provided. The one or more protective films described herein may be mixed conduction materials, which are both electronic conducting and ion-conducting. The one or more protective films described herein may include materials selected from lithium transition metal dichalcogenides, $Li_9Ti_5O_{12}$, or a combination thereof. The lithium transition metal dichalcogenide includes a transition metal dichalcogenide having the formula $MX_2$, wherein M is selected from Ti, Mo, or W and X is selected from S, Se, or Te. The transition metal dichalcogenide may be selected from $TiS_2$, $MoS_2$, $WS_2$, or a combination thereof. The lithium transition metal dichalcogenide may be selected from lithium-titanium-disulfide (e.g., $LiTiS_2$), lithium-tungsten-disulfide (e.g., $LiWS_2$), lithium-molybdenum-disulfide (e.g., $LiMoS_2$), or a combination thereof.

6 Claims, 4 Drawing Sheets

Related U.S. Application Data

(60) Provisional application No. 62/862,104, filed on Jun. 16, 2019.

(51) Int. Cl.

| | | |
|---|---|---|
| *H01M 4/134* | (2010.01) | |
| *H01M 4/1395* | (2010.01) | |
| *H01M 4/36* | (2006.01) | |
| *H01M 4/38* | (2006.01) | |
| *H01M 4/66* | (2006.01) | |
| *H01M 10/0525* | (2010.01) | |
| *H01M 10/0562* | (2010.01) | |
| *H01M 4/02* | (2006.01) | |

(52) U.S. Cl.
CPC ......... *H01M 4/1395* (2013.01); *H01M 4/366* (2013.01); *H01M 4/382* (2013.01); *H01M 4/661* (2013.01); *H01M 10/0525* (2013.01); *H01M 10/0562* (2013.01); *H01M 2004/027* (2013.01); *H01M 2300/0068* (2013.01)

(56) References Cited

U.S. PATENT DOCUMENTS

| | | | |
|---|---|---|---|
| 7,432,017 | B2 | 10/2008 | Visco et al. |
| 2004/0126653 | A1 | 7/2004 | Visco et al. |
| 2004/0131944 | A1 | 7/2004 | Visco et al. |
| 2005/0079420 | A1* | 4/2005 | Cho ................... H01M 10/052 429/231.95 |
| 2008/0057399 | A1 | 3/2008 | Visco et al. |
| 2008/0318132 | A1 | 12/2008 | Visco et al. |
| 2012/0117348 | A1 | 5/2012 | Triantafillou et al. |
| 2013/0280581 | A1 | 10/2013 | Sun et al. |
| 2016/0276865 | A1 | 9/2016 | Pike et al. |
| 2017/0136894 | A1 | 5/2017 | Ricci |
| 2017/0149093 | A1 | 5/2017 | Sun et al. |
| 2017/0156466 | A1 | 6/2017 | Lambrechts et al. |
| 2017/0279155 | A1 | 9/2017 | Sun et al. |
| 2018/0083279 | A1 | 3/2018 | Takami et al. |
| 2018/0287156 | A1* | 10/2018 | Yu ............................. C09C 1/36 |
| 2020/0395618 | A1 | 12/2020 | Rangasamy et al. |

FOREIGN PATENT DOCUMENTS

| | | | | |
|---|---|---|---|---|
| CN | 1645648 | A | 7/2005 | |
| CN | 103794800 | A | 5/2014 | |
| CN | 103199299 | B | 2/2015 | |
| CN | 107154499 | | 9/2017 | |
| CN | 107636204 | A | 1/2018 | |
| CN | 108140824 | * | 6/2018 | ............ H01M 4/485 |
| CN | 108140824 | A | 6/2018 | |
| CN | 109461886 | * | 3/2019 | ........ H01M 10/0525 |
| CN | 109461886 | A | 3/2019 | |
| CN | 109830690 | * | 5/2019 | ........ H01M 10/0525 |
| CN | 109830690 | A | 5/2019 | |
| JP | 58-181268 | | 10/1983 | |
| JP | H04248276 | A | 9/1992 | |
| JP | 2005063978 | A | 3/2005 | |
| JP | 2011034693 | A | 2/2011 | |
| JP | 2014532281 | A | 12/2014 | |
| JP | 2018515692 | A | 6/2018 | |
| KR | 20050038905 | A | 4/2005 | |
| KR | 20120032044 | A | 4/2012 | |
| KR | 10-1575476 | | 12/2015 | |
| KR | 20150134114 | A | 12/2015 | |
| WO | 2017131997 | A1 | 8/2017 | |
| WO | WO-2017131997 | A1 * | 8/2017 | ............. B32B 15/04 |
| WO | 2017193778 | A1 | 11/2017 | |
| WO | 2018148518 | A1 | 8/2018 | |
| WO | 2018210791 | A1 | 11/2018 | |
| WO | 2019065066 | A1 | 4/2019 | |

OTHER PUBLICATIONS

Cha et al, 2D MoS2 as an efficient protective layer for lithium metal anodes in high-performance Li—S batteries, 13 Nature Nanotechnology 337-344 (Year: 2018).*

Michael G. Verde et al, Elucidating The Phase Transformation of Li4Ti5O12 Lithiation at the Nanoscale, American Chemical Society Nano 2016, 10, pp. 4312?4321.

Michal Krajewski, et al, Electrochemical Properties of Lithium-titanium Oxide, Modified with Ag—Cu Particles, as a Negative Electrode for Lithium-ion Batteries, Royal Society of Chemistry Adv., 2017, 7, pp. 52151-52164.

Xiao Hua, et al, Lithiation Thermodynamics and Kinetics of the TiO2 (B) Nanoparticles, Journal of the American Chemical Society, 2017, 139, pp. 13330?13341.

"Cha, E. et al., "2D MoS2 as an efficient protective layer for lithium metal anodes in high-performance Li—S batteries", Nature Nanotechnology, 2018, vol. 13, No. 4, pp. 337-344".

International Search Report and Written Opinion for International Application No. PCT/US2020/026013 dated Jul. 30, 2020.

Korean Office Action dated Oct. 8, 2021 for Application No. 10-2020-7011471.

Singapore Search Report and Written Opinion dated Mar. 30, 2023 for Application No. 11202112612Y.

Japanese Office Action dated Jan. 24, 2023 for Application No. 2021-573847.

Chinese Office Action dated Jul. 18, 2023 for Application No. 202080044347.X.

Extended European Search Report dated Sep. 29, 2023 for Application No. 20825978.8.

Singapore Written Opinion dated Oct. 13, 2023 for Application No. 11202112612Y.

* cited by examiner

PROTECTION INTERFACES FOR Li-ion BATTERY ANODES

CROSS-REFERENCE TO RELATED APPLICATIONS

This application is a divisional of U.S. patent application Ser. No. 16/777,653, filed Jan. 30, 2020, which claims benefit to U.S. Prov. Pat. Appl. No. 62/862,104, filed Jun. 16, 2019, which are incorporated herein by reference in their entirety.

BACKGROUND

Field

Implementations of the present disclosure provide electrodes having protective films formed thereon, high performance electrochemical devices, such as primary and secondary electrochemical devices, including the aforementioned protective films and electrodes, and methods for fabricating the same.

Description of the Related Art

Lithium (Li) ion batteries have played a role in the development of current generation mobile devices, microelectronics and electric vehicles. A typical Li-ion battery is made of a positive electrode (cathode), a negative electrode (anode), an electrolyte to conduct ions, a porous separator membrane (electrical insulator) between the two electrodes to keep them physically apart and the packaging. Current Li-ion batteries have energy densities ranging around 650 Wh/l. Theoretical specific capacity of the current anode (graphite) at 372 mAh/g limits enhancing the energy density of the batteries. In comparison, a lithium metal anode offers a theoretical specific capacity of 3860 mAh/g (~10 times that of graphite) and a silicon anode offers 4200 mAh/g (~12 times that of graphite). To achieve energy densities higher than 1000 Wh/l, high specific capacity electrodes such as lithium metal anodes or silicon-graphite anodes are needed.

Lithium and silicon anodes face challenges arising from volumetric change during battery cycling and formation of solid electrolyte interphase (SEI) due to reactivity with electrolyte. The formed SEI layer acts as a barrier layer to the penetration of lithium ions and adversely affects the kinetics at the anode. This layer is not static. As a result, with repeated cycling, the SEI layer is partially depleted and re-formed leading to continued inefficiency. In a typical Li-ion battery, positive electrode has lower specific capacity (typically about 50% of anode) of the two electrodes. Since the cathode acts as the lithium source within the cell, lithium lost in the SEI formation at the anode comes from the lower capacity electrode, thus adversely affecting the energy density.

One aspect of lithium anodes is the formation of dendrites during battery charging. A new lithium surface is repeatedly formed and depleted during cycling, which leads to the formation of an inefficient SEI layer with every deposition and subsequent depletion. Along with the SEI based inefficiencies, the formation of dendrites that grow all the way to the cathode resulting in thermal runaway have plagued the safety of Li metal batteries.

In either of the above cases, the formation of a stable (chemically and structurally) and conducting layer will greatly benefit the anodes. Approaches so far have focused on utilizing one of two options. In one approach, a rigid ceramic layer, which is ion conducting, is used to prevent the growth of dendrites and possible formation of SE. This approach has been attempted with various ceramic layers such as $Al_2O_3$. In another approach, an electronic conducting layer is used to promote electronic conductivity. However, usage of a predominantly single conduction layer typically leads to an increase in overall cell resistance.

Therefore, there is a need for improved protected films for protecting electrodes.

SUMMARY

Implementations of the present disclosure provide electrodes having protective films formed thereon, high performance electrochemical devices, such as primary and secondary electrochemical devices, including the aforementioned protective films and electrodes, and methods for fabricating the same.

In at least one implementation, a method is provided. The method comprises forming a lithium metal film on a current collector. The current collector comprises copper and/or stainless steel. The method further comprises forming a protective film stack on the lithium metal film. Forming the protective film stack comprises forming a first protective film on the lithium metal film, wherein the first protective film comprises $Li_9Ti_5O_{12}$.

In another implementation, an anode electrode structure is provided. The anode electrode structure comprises a current collector comprising copper and/or stainless steel. The anode electrode structure further comprises a lithium metal film formed on the current collector. The anode electrode structure further comprises a protective film stack formed on the lithium metal film. The protective film stack comprises a first protective film formed on the lithium metal film, wherein the first protective film comprises $Li_9Ti_5O_{12}$.

In yet another implementation, an energy storage device is provided. The energy storage device comprises an anode electrode structure. The anode electrode structure comprises a current collector comprising copper and/or stainless steel. The anode electrode structure further comprises a lithium metal film formed on the current collector. The anode electrode structure further comprises a protective film stack formed on the lithium metal film. The protective film stack comprises a first protective film formed on the lithium metal film, wherein the first protective film comprises $Li_9Ti_5O_{12}$. The energy storage device further comprises a cathode electrode structure. The energy storage device further comprises a solid electrolyte film formed between the anode electrode structure and the cathode electrode structure.

In yet another implementation, a method is provided. The method comprises forming a lithium metal film on a current collector, wherein the current collector comprises copper and/or stainless steel. The method further comprises forming a protective film on the lithium metal film, comprising a lithium transition metal dichalcogenide.

In yet another implementation, an anode electrode structure is provided. The anode electrode structure comprises a current collector comprising copper and/or stainless steel, a lithium metal film formed on the current collector, and a protective film formed on the lithium metal film. The first protective film comprises a lithium transition metal dichalcogenide.

In yet another implementation, a method is provided. The method comprises forming a graphite-containing film on a current collector. The current collector comprises copper and/or stainless steel. The method further comprises forming a protective film stack on the graphite-containing film.

Forming the protective film stack comprises forming a first protective film on the graphite-containing film. The first protective film comprises $Li_9Ti_5O_{12}$.

In yet another implementation, an anode electrode structure is provided. The anode electrode structure comprises a current collector comprising copper and/or stainless steel. The anode electrode structure further comprises a graphite-containing film formed on the current collector. The anode electrode structure further comprises a protective film stack formed on the graphite-containing film. The protective film stack comprises a first protective film formed on the graphite-containing film, wherein the first protective film comprises $Li_9Ti_5O_{12}$.

In yet another implementation, an energy storage device is provided. The energy storage device comprises an anode electrode structure. The anode electrode structure comprises a current collector comprising copper and/or stainless steel. The anode electrode structure further comprises a graphite-containing film formed on the current collector. The anode electrode structure further comprises a protective film stack formed on the graphite-containing film. The protective film stack comprises a first protective film formed on the graphite-containing film, wherein the first protective film comprises $Li_9Ti_5O_{12}$. The energy storage device further comprises a cathode electrode structure. The energy storage device further comprises a solid electrolyte film formed between the anode electrode structure and the cathode electrode structure.

In yet another implementation, a method is provided. The method comprises forming a graphite-containing film on a current collector. The current collector comprises copper and/or stainless steel. The method further comprises forming a protective film on the graphite-containing film. The protective film comprises a lithium transition metal dichalcogenide.

In yet another implementation, an anode electrode structure is provided. The anode electrode structure comprises a current collector comprising copper and/or stainless steel. The anode electrode structure further comprises a graphite-containing film formed on the current collector. The anode electrode structure further comprises a protective film formed on the graphite-containing film, wherein the protective film comprises a lithium transition metal dichalcogenide.

In yet another implementation, an energy storage device is provided. The energy storage device comprises an anode electrode structure. The anode electrode structure comprises a current collector comprising copper and/or stainless steel. The anode electrode structure further comprises a graphite-containing film formed on the current collector. The anode electrode structure further comprises a protective film formed on the graphite-containing film, wherein the protective film comprises a lithium transition metal dichalcogenide. The energy storage device further comprises a cathode electrode structure. The energy storage device further comprises a solid electrolyte film formed between the anode electrode structure and the cathode electrode structure.

In yet another implementation, a method is provided. The method comprises forming a lithium metal film on a current collector, wherein the current collector comprises copper and/or stainless steel, and forming a protective film stack on the lithium metal film, comprising forming a first protective film on the lithium metal film, wherein the first protective film comprises lithiated lithium-titanium-oxide (LTO).

In yet another implementation, an anode electrode structure is provided. The anode electrode structure, comprising a current collector comprising copper and/or stainless steel, a lithium metal film formed on the current collector, and a protective film stack formed on the lithium metal film, comprising a first protective film formed on the lithium metal film, wherein the first protective film comprises lithiated-LTO.

In yet another implementation, a method is provided. The method comprises forming a graphite-containing film on a current collector, wherein the current collector comprises copper and/or stainless steel, and forming a protective film stack on the graphite-containing film, comprising forming a first protective film on the graphite-containing film, wherein the first protective film comprises lithiated lithium-titanium-oxide (LTO).

In yet another implementation, an anode electrode structure is provided. The anode electrode structure comprises a current collector comprising copper and/or stainless steel, a graphite-containing film formed on the current collector, and a protective film stack formed on the graphite-containing film, comprising a first protective film formed on the graphite-containing film, wherein the first protective film comprises lithiated-LTO.

BRIEF DESCRIPTION OF THE DRAWINGS

So that the manner in which the above-recited features of the present disclosure can be understood in detail, a more particular description of the implementations, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

Figure 1:
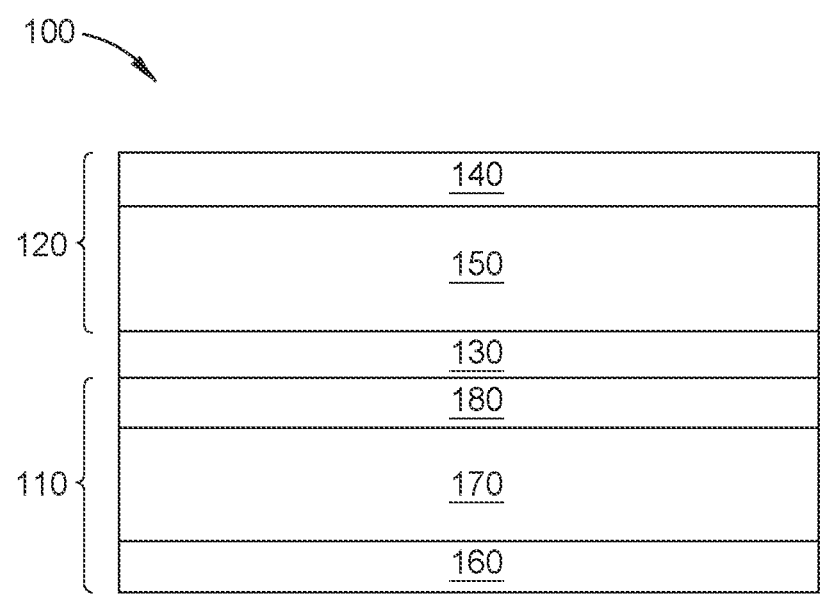
FIG. 1 illustrates a schematic cross-sectional view of one implementation of an energy storage device incorporating an electrode structure formed according to one or more implementations described herein.

To facilitate understanding, identical reference numerals have been used, where possible, to designate identical elements that are common to the figures. It is contemplated that elements and features of one implementation may be beneficially incorporated in other implementations without further recitation.

DETAILED DESCRIPTION

The following disclosure describes electrodes having protective films formed thereon, high performance electrochemical devices, such as primary and secondary electrochemical devices, including the aforementioned protective films and electrodes, and methods for fabricating the same. Certain details are set forth in the following description and in FIGS. 1-6 to provide a thorough understanding of various implementations of the disclosure. Other details describing well-known structures and systems often associated with electrochemical cells and batteries are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

Some implementations described herein will be described below in reference to a reel-to-reel coating system, such as TopMet™, SMARTWEB@, TopBeam™, all of which are available from Applied Materials, Inc. of Santa Clara, California Other tools capable of performing vapor deposition processes (e.g., physical vapor deposition (PVD) processes, chemical vapor deposition (CVD) processes, atomic layer deposition (ALD) processes) may also be adapted to benefit from the implementations described herein. In addition, any system enabling the vapor deposition processes described herein can be used to advantage. The apparatus description described herein is illustrative and should not be construed or interpreted as limiting the scope of the implementations described herein. It should also be understood that although described as a reel-to-reel process, the implementations described herein may be performed on discrete substrates.

As described herein, flexible substrates can be considered to include among other things, films, foils, webs, strips of plastic material, metal, paper, or other materials. Typically, the terms "web," "foil," "strip," "substrate" and the like are used synonymously.

In some implementations, the protective films described herein are used with an energy storage device, such as a Li-ion battery or a solid-state battery. Li-ion batteries, typically include a positive electrode (e.g., cathode), and a negative electrode separated by a polymer separator with a liquid electrolyte. Solid-state batteries typically include a positive electrode (e.g., cathode) and a negative electrode (e.g., anode) but replace both the polymer separator and the liquid electrolyte with an ion-conducting material.

As described herein, LTO generally refers to any lithium titanium-based oxide (e.g., $Li_4Ti_5O_{12}$) having a spinel structure. As such, an LTO material generally includes lithium, titanium, and oxygen, and, in certain embodiments, may include other dopant atoms as well.

As described herein, lithiated-LTO generally refers to any lithium titanium-based oxide that has undergone lithiation (e.g., $Li_7Ti_5O_{12}$, $Li_9Ti_5O_{12}$). As such, an LTO material generally includes lithium, titanium, and oxygen, and, in certain embodiments, may include other dopant atoms as well.

Li-ion batteries play a vital role in the development of current generation mobile devices, microelectronics and electric vehicles. Current Li-ion batteries have energy densities ranging around 650 Wh/l. Theoretical specific capacity of the current anode (e.g., graphite), which is at 372 mAh/g, limits enhancing the energy density of the batteries. In comparison, a Li metal anode offers a theoretical specific capacity of 3,860 mAh/g (~10 times that of graphite) and a silicon anode offers 4,200 mAh/g (~12 times that of graphite). Thus, to achieve energy densities higher than 1,000 Wh/l, high specific capacity electrodes such as Li metal anodes or Silicon-Graphite anodes are needed.

Li metal anodes and silicon anodes face challenges arising from volumetric change during battery cycling, formation of solid electrolyte interphase (SEI) due to reactivity with electrolyte. The formed SEI layer acts as a barrier layer to Li ions and adversely affects the kinetics at the anode. The SEI layer is not static. As a result, with repeated cycling, the SEI layer is partially depleted and re-formed leading to continued inefficiency. In a typical Li-ion battery, the positive electrode has a lower specific capacity (typically about 50% of anode) of the two electrodes. Since the cathode acts as the lithium source within the cell, lithium lost during SEI formation at the anode is supplied by the lower capacity electrode, thus adversely affecting the energy density.

One problem with lithium anodes is the formation of dendrites during battery charging. During cycling, a new lithium surface repeatedly forms and depletes on the lithium anode. This repeated formation and depletion leads to the formation of inefficient SEI layer with every deposition and subsequent depletion. Along with SEI based inefficiencies, dendrites that grow all the way to the cathode result in thermal runaway, which has plagued the safety of Li metal batteries. In either of the above cases, the formation of a stable (chemically and structurally) and conducting layer will greatly benefit the anodes. So far, approaches have focused on utilizing one of two options. In one approach, a ceramic/ion conducting rigid layer prevents growth of dendrites and possible formation of SE. This approach has also been attempted with various ceramic layers such as $Al_2O_3$ etc. In another approach, an electronic conducting layer promotes electronic conductivity in the anode layer. However, use of a predominantly single conduction layer leads to an increase in overall cell resistance.

Using the implementations described herein, the deposited lithium metal, either single-sided or dual-sided, can be protected during winding and unwinding of the reels downstream. Deposition of one or more thin protective films as described herein has several advantages. First, in some implementations, the one or more protective films described herein provide adequate surface protection for shipping, handling, and storage as well as avoiding surface reactions of lithium during device integration. Second, in some implementations, the one or more protective films described herein are compatible with lithium ions and reduce impedance for ions to move across the protective film. Third, in some implementations, the one or more protective films described herein are mixed conduction materials, which are both electronic conducting and ion-conducting and thus may be incorporated into the formed energy storage device. Fourth, in some implementations, the one or more protective films described herein help suppress or eliminate lithium dendrites, especially at high current density operation. Fifth, in some implementations, the use of protective films described herein reduces the complexity of manufacturing systems and is compatible with current manufacturing systems.

In some implementations, the protective films include materials selected from lithium transition metal dichalcogenides, lithiated-LTO (e.g., $Li_7Ti_5O_{12}$, $Li_9Ti_5O_{12}$), or a combination thereof. The lithium transition metal dichalcogenide may comprise a transition metal dichalcogenide having the formula $MX_2$, wherein M is selected from Ti, Mo, or W and X is selected from S, Se, or Te. In one example, the transition metal dichalcogenide is selected from $TiS_2$, $MoS_2$, $WS_2$, or a combination thereof. In another example, the lithium transition metal dichalcogenide is selected from lithium-titanium-disulfide (e.g., $LiTiS_2$), lithium-tungsten-disulfide (e.g., $LiWS_2$), lithium-molybdenum-disulfide (e.g., $LiMoS_2$), or a combination thereof.

In some implementations, the protective film is a single-layer film. In other implementations, the protective film includes multiple layers, such as a dual layer protective film stack. The protective film stack comprises at least a first protective film and a second protective film formed on the first protective film. In one example, the first protective film comprises lithiated-LTO (e.g., $Li_7Ti_5O_{12}$ $Li_9Ti_5O_{12}$) and the second protective film comprises a lithium transition metal dichalcogenide. In another example, the first protective film comprises lithiated-LTO (e.g., $Li_7Ti_5O_{12}$ $Li_9Ti_5O_{12}$) and the second protective film comprises a lithium-titanium-disulfide. In some implementations, the protective film has a thickness of 100 nanometers or less.

In some implementations, the protective film is formed on a negative electrode structure. In one example, the negative electrode structure is a lithium metal film. In another example, the negative electrode structure is a silicon film. In another example, the negative electrode structure is a graphite-containing film. In another example, the negative electrode structure is a silicon graphite film.

In some implementations, a protective film is formed by depositing a seed layer, LTO (e.g., $Li_4Ti_5O_{12}$), using a physical vapor deposition (PVD) process onto a negative electrode structure. The seed layer is then reduced to lithiated-LTO (e.g., e.g., $Li_7Ti_5O_{12}$ $Li_9Ti_5O_{12}$) either on contact with the lithium metal film or during lithiation of a silicon and/or graphite film.

In some implementations, the protective film is deposited via atomic layer deposition (ALD) by reacting the precursors for a targeted number of cycles based on the target protective film thickness. In one example, $LiTiS_2$, $TiS_2$ is deposited via an ALD process using $TiCl_4$ and $H_2S$.

Not to be bound by theory, but it is believed that adopting such an electrochemically active layer provides an interface above the Li/Si anode that subjects the incoming Li ions to a surface potential that is higher than the voltage where dendritic growth becomes an issue. In addition, the materials utilized in the present disclosure are also capable of fast charging/discharging in their application as anodes such that the materials do not introduce kinetic limitations into the system.

FIG. 1 illustrates a schematic cross-sectional view of one implementation of an energy storage device 100 incorporating an anode electrode structure having one or more protective film(s) 180 formed according to implementations described herein. In some implementations, the energy storage device 100 is a solid-state energy storage device or a lithium-ion based energy storage device. The energy storage device 100, even though shown as a planar structure in FIG. 1, may be formed into a cylinder by rolling the stack of layers; furthermore, other cell configurations (e.g., prismatic cells, button cells, or stacked electrode cells) may be formed. The energy storage device 100 includes an anode electrode structure 110 and a cathode electrode structure 120 with a solid-electrolyte film 130 positioned therebetween. In some implementations, where the energy storage device 100 is a Li-ion energy storage device, the solid-electrolyte film 130 is replaced with a polymer separator and a liquid electrolyte. The cathode electrode structure 120 includes a cathode current collector 140 and a cathode film 150. The anode electrode structure 110 includes an anode current collector 160, an anode film 170, and one or more protective film(s) 180.

The cathode electrode structure 120 includes the cathode current collector 140 with the cathode film 150 formed on the cathode current collector 140. It should be understood that the cathode electrode structure 120 may include other elements or films.

The current collectors 140, 160, on the cathode film 150 and the anode film 170, respectively, can be identical or different electronic conductors. In some implementations, at least one of the current collectors 140, 160 is a flexible substrate. In one example, the flexible substrate is a CPP film (i.e., a casting polypropylene film), an OPP film (i.e., an oriented polypropylene film), or a PET film (i.e., an oriented polyethylene terephthalate film). Alternatively, the flexible substrate may be a pre-coated paper, a polypropylene (PP) film, a PEN film, a poly lactase acetate (PLA) film, or a PVC film. Examples of metals that the current collectors 140, 160 may be comprised of include aluminum (Al), copper (Cu), zinc (Zn), nickel (Ni), cobalt (Co), manganese (Mn), chromium (Cr), stainless steel, clad materials, alloys thereof, and a combination thereof. In some implementations, at least one of the current collectors 140, 160 is perforated. In some implementations, at least one of the current collectors 140, 160 includes a polymer substrate (e.g., polyethylene terephthalate ("PET") coated with a metallic material). In one example, the anode current collector 160 is a polymer substrate (e.g., a PET film) coated with copper. In some implementations, the anode current collector 160 is a multi-metal layer on a polymer substrate. The multi-metal layer can be a combination of copper, chromium, nickel, etc. In some implementations, the anode current collector 160 is a multi-layer structure that includes a copper-nickel cladding material. In one example, the multi-layer structure includes a first layer of nickel or chromium, a second layer of copper formed on the first layer, and a third layer including nickel, chromium, or both formed on the second layer. In another example, the anode current collector 160 is nickel coated copper. Furthermore, current collectors may be of any form factor (e.g., metallic foil, sheet, or plate), shape and micro/macro structure.

Generally, in prismatic cells, tabs are formed of the same material as the current collector and may be formed during fabrication of the stack, or added later. In some implementations, the current collectors extend beyond the stack and the portions of the current collector extending beyond the stack may be used as tabs. In one example, the cathode current collector 140 is aluminum. In another example, the cathode current collector 140 comprises aluminum deposited on a polymer substrate (e.g., a PET film). In some implementations, the cathode current collector 140 has a thickness below 50 μm more specifically, 5 μm or, even more specifically 2 μm. In some implementations, the cathode current collector 140 has a thickness from about 0.5 μm to about 20 μm (e.g., from about 1 μm to about 10 μm; from about 2 μm to about 8 μm; or from about 5 μm to about 10 μm). In one example, the anode current collector 160 is copper. In another example, the anode current collector 160 is stainless steel. In some implementations, the anode current collector 160 has a thickness below 50 μm more specifically, 5 μm or, even more specifically 2 μm. In one example, the anode current collector 160 has a thickness from about 0.5 μm to about 20 μm (e.g., from about 1 μm to about 10 μm; from about 2 μm to about 8 μm; from about 6 μm to about 12 μm; or from about 5 μm to about 10 μm).

The cathode film 150 or cathode may be any material compatible with the anode and may include an intercalation compound, an insertion compound, or an electrochemically active polymer. Suitable intercalation materials include, for example, lithium-containing metal oxides, $MoS_2$, $FeS_2$, $BiF_3$, $Fe_2OF_4$, $MnO_2$, $TiS_2$, $NbSe_3$, $LiCoO_2$, $LiNiO_2$, $LiMnO_2$, $LiMn_2O_4$, $V_6O_{13}$ and $V_2O_5$. Suitable polymers include, for example, polyacetylene, polypyrrole, polyaniline, and polythiophene. In some implementations, the cathode film 150 or cathode is made from a layered oxide, such as lithium cobalt oxide, an olivine, such as lithium iron phosphate, or a spinel, such as lithium manganese oxide. Suitable lithium-containing oxides may be layered, such as lithium cobalt oxide ($LiCoO_2$), or mixed metal oxides, such as $LiNi_xCo_{1-2x}MnO_2$, $LiNiMnCoO_2$ ("NMC"), $LiNi_{0.5}Mn_{1.5}O_4$, $Li(Ni_{0.8}Co_{0.15}Al_{0.05})O_2$, $LiMn_2O_4$, and doped lithium rich layered-layered materials, wherein x is zero or a non-zero number. Suitable lithium-containing phosphates may be iron olivine ($LiFePO_4$) and its variants (such as $LiFe_{(1-x)}Mg_xPO_4$), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$, wherein x is zero or a non-zero number. Suitable lithium-containing fluorophosphates may be $LiVPO_4F$, $LiAlPO_4F$, $Li_5V(PO_4)_2F_2$ $Li_5Cr(PO_4)_2F_2$ $Li_2CoPO_4F$, or $Li_2NiPO_4F$. Suitable lithium-containing silicates may be $Li_2FeSiO_4$, $Li_2MnSiO_4$, or $Li_2VOSiO_4$. One example of a suitable non-lithium compound is $Na_5V_2(PO_4)_2F_3$.

The anode film 170 may be any material compatible with the cathode film 150. In some implementations, the anode film 170 has an energy capacity greater than or equal to 372 mAh/g, preferably 700 mAh/g, and most preferably 1000 mAh/g. In some implementations, the anode film 170 is constructed from graphite, silicon-containing graphite, lithium metal, lithium metal foil or a lithium alloy foil (e.g. lithium aluminum alloys), or a mixture of a lithium metal and/or lithium alloy and materials such as carbon (e.g. coke, graphite), nickel, copper, tin, indium, silicon, oxides thereof, or a combination thereof. In some implementations, the anode film 170 comprises intercalation compounds containing lithium or insertion compounds containing lithium. In one example, the anode film 170 is a lithium metal film. The lithium metal film may be deposited using the methods described herein.

In some implementations, the anode film 170 has a thickness from about 10 μm to about 200 μm (e.g., from about 1 μm to about 100 μm; from about 10 μm to about 30 μm; from about 20 μm to about 30 μm; from about 1 μm to about 20 μm; or from about 50 μm to about 100 μm).

In some implementations, the one or more protective film(s) 180 is formed on the anode film 170. In some implementations, the protective film(s) 180 include materials selected from lithium transition metal dichalcogenides, lithiated-LTO (e.g., $Li_7Ti_5O_{12}$ $Li_9Ti_5O_{12}$), or a combination thereof. In some implementations, the lithium transition metal dichalcogenide comprises a transition metal dichalcogenide having the formula $MX_2$, wherein M is selected from Ti, Mo, or W and X is selected from S, Se, or Te. In one example, the transition metal dichalcogenide is selected from $TiS_2$, $MoS_2$, $WS_2$, or a combination thereof. In one example, the lithium transition metal dichalcogenide is selected from lithium-titanium-disulfide (e.g., $LiTiS_2$), lithium-tungsten-disulfide (e.g., $LiWS_2$), lithium-molybdenum-disulfide (e.g., $LiMoS_2$), or a combination thereof.

In some implementations, the protective film(s) 180 is a single-layer film. In other implementations, the protective film includes multiple layers, such as a dual layer protective film stack. The protective film stack comprises at least a first protective film and a second protective film formed on the first protective film. In one example, the first protective film comprises lithiated-LTO (e.g., $Li_7Ti_5O_{12}$ $Li_9Ti_5O_{12}$) and the second protective film comprises a lithium transition metal dichalcogenide. In another example, the first protective film comprises lithiated-LTO (e.g., $Li_7Ti_5O_{12}$ $Li_9Ti_5O_{12}$) and the second protective film comprises lithium-titanium-disulfide. In some implementations, the protective film has a thickness of 100 nanometers or less.

In some implementations, the one or more protective film(s) 180 are mixed conduction materials, which are both electronic conducting and ion-conducting and thus may be incorporated into the formed energy storage device. In some implementations, the one or more protective film(s) 180 are ion-conducting films. In one example, the one or more protective film(s) 180 are permeable to at least one of lithium ions and lithium atoms. In some implementations, the one or more protective film(s) 180 provide surface protection of the anode film 170, which allows for handling of the anode film in a dry room. In some implementations, where the energy storage device 100 is a solid-state energy storage device, the one or more protective film(s) 180 contribute to the formation of an improved SEI layer and thus improve device performance. In some implementations, the one or more protective film(s) 180 can be directly deposited on the anode film 170 by Physical Vapor Deposition (PVD), such as evaporation (e.g., thermal or e-beam) or sputtering, atomic layer deposition (ALD), a slot-die process, dip coating, a thin-film transfer process, gravure coating or a three-dimensional lithium printing process.

In some implementations, each layer of the one or more protective film(s) 180 is a coating or discrete film having a thickness of 500 nanometers or less (e.g., from about 1 nm to about 400 nm; from about 25 nm to about 300 nm; from about 50 nm to about 200 nm; from about 100 nm to about 150 nm; from about 10 nm to about 80 nm; or from about 30 to about 60 nanometers). In other implementations, each layer of the one or more protective film(s) 180 is a coating or discrete film having a thickness of 100 nanometers or less (e.g., from about 5 nanometers to about 100 nanometers; from about 5 nanometers to about 40 nanometers; from about 10 nanometers to about 20 nanometers; or from about 50 nanometers to about 100 nanometers).

In some implementations, the solid-electrolyte film 130 is a lithium-ion conducting material. The lithium-ion conducting material may be a lithium-ion conducting ceramic or a lithium-ion conducting glass. In one example, the Li-ion conducting material is comprised of one or more of LiPON, doped variants of either crystalline or amorphous phases of $Li_7La_3Zr_2O_{12}$, doped anti-perovskite compositions, argyrodite compositions (e.g., $Li_6PS_5Br$, $Li_6PS_5Cl$, $Li_7PS_6$, $Li_6PS_5I$, $Li_6PO_5Cl$), lithium-sulfur-phosphorous materials, $Li_2S$—$P_2S_5$, $LiloGeP_2S_{12}$, $Li_3PS_4$, lithium phosphate glasses, $(1-x)LiI-(x)Li_4SnS_4$, $xLiI-(1-x)Li_4SnS_4$, mixed sulfide and oxide electrolytes, crystalline LLZO, amorphous $(1-x)LiI-(x)Li_4SnS_4$ mixture, amorphous $xLiI-(1-x)Li_4SnS_4$, $Li_3S(BF_4)_{0.5}Cl_{0.5}$, $Li_4Ti_5O_{12}$, lithium doped lanthanum titanate (LATP), $Li_{(2+2x)}Zn_{(1-x)}GeO_4$, $LiM_2(PO_4)_3$, where M=Ti, Ge, Hf, for example. In one example, x is between 0 and 1 (e.g., 0.1, 0.2, 0.3, 0.4, 0.5, 0.6, 0.7, 0.8, and 0.9).

Figure 2:
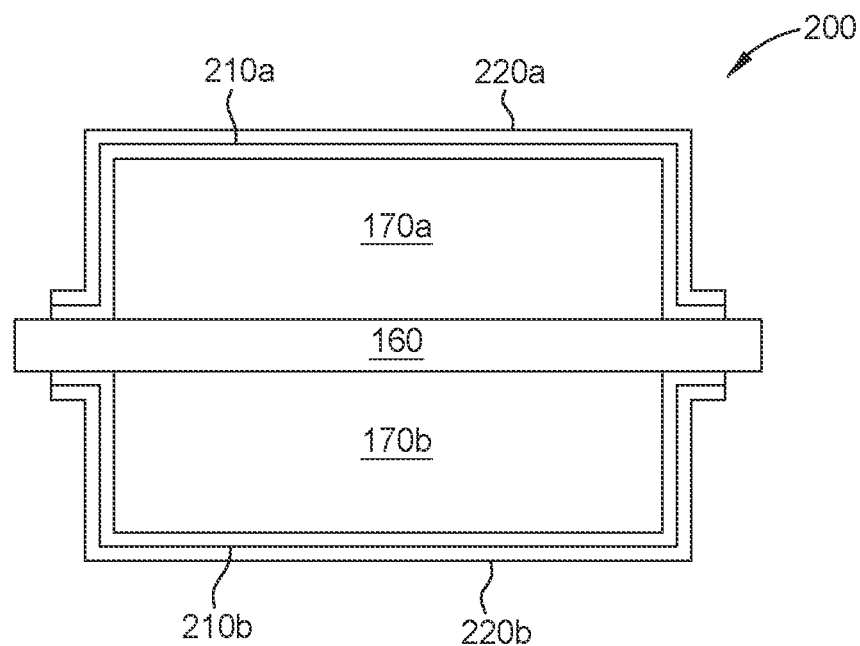
FIG. 2 illustrates a cross-sectional view of one implementation of a dual-sided anode electrode structure formed according to one or more implementations described herein.

FIG. 2 illustrates a cross-sectional view of one implementation of an anode electrode structure 200 formed according to one or more implementations described herein. Note in FIG. 2 that the anode current collector 160 is shown to extend beyond the stack, although it is not necessary for the anode current collector 160 to extend beyond the stack, the portions extending beyond the stack may be used as tabs. Although the anode electrode structure 200 is depicted as a dual-sided electrode structure, it should be understood that the aspects described herein also apply to single-sided electrode structures.

The anode electrode structure 200 has the anode current collector 160, anode films 170a, 170b (collectively 170) formed on opposing sides of the anode current collector 160. In some implementations, the anode film 170 is constructed from lithium metal, silicon, graphite, silicon-containing graphite, or a combination thereof. In one example, the anode film 170 is a lithium metal film. In some implementations, the anode film 170 has a thickness of 20 micrometers or less (e.g., from about 1 micrometer to about 20 micrometer). In some implementations, a first protective film 210a, 210b (collectively 210) is formed on each of the anode films 170a, 170b. In one example, the first protective film 210 comprises a mixed conduction material as described herein. In one example, the first protective film 210 comprises $Li_9Ti_5O_{12}$, a lithium transition metal dichalcogenide, or a combination thereof. In some implementations, the first protective film 210 has a thickness of 100 nanometers or less (e.g., from about 5 nanometers to 100 nanometers; from about 5 nanometers to about 40 nanometers; from about 10 nanometers to about 20 nanometers; or from about 50 nanometers to about 100 nanometers). In some implementations, as depicted in FIG. 2, the first protective film 210 coats the exposed surfaces (e.g., top surface and sidewalls) of the anode film 170 extending to contact the anode current collector 160.

In some implementations, a second protective film 220a, 220b (collectively 220) is formed on each on the first protective film(s) 210. The second protective film 220 may comprise a mixed conduction material as described herein. The second protective film 220 is different from the first protective film 210. In some implementations, the second protective film 220 is permeable to at least one of lithium ions and lithium atoms.

In one example, the second protective film 220 is a lithium transition metal dichalcogenide. In some implementations, the second protective film 220 has a thickness of 100 nanometers or less (e.g., from about 5 nanometers to 100 nanometers; from about 5 nanometers to about 40 nanometers; from about 10 nanometers to about 20 nanometers; or from about 50 nanometers to about 100 nanometers).

In one example, the first protective film 210 comprises lithiated-LTO (e.g., $Li_7Ti_5O_{12}$ $Li_9Ti_5O_{12}$) and the second protective film 220 is a lithium transition metal dichalcogenide. In another example, the first protective film 210 comprises lithiated-LTO (e.g., $Li_7Ti_5O_{12}$ $Li_9Ti_5O_{12}$) and the second protective film 220 is $LiTiS_2$.

Figure 3:
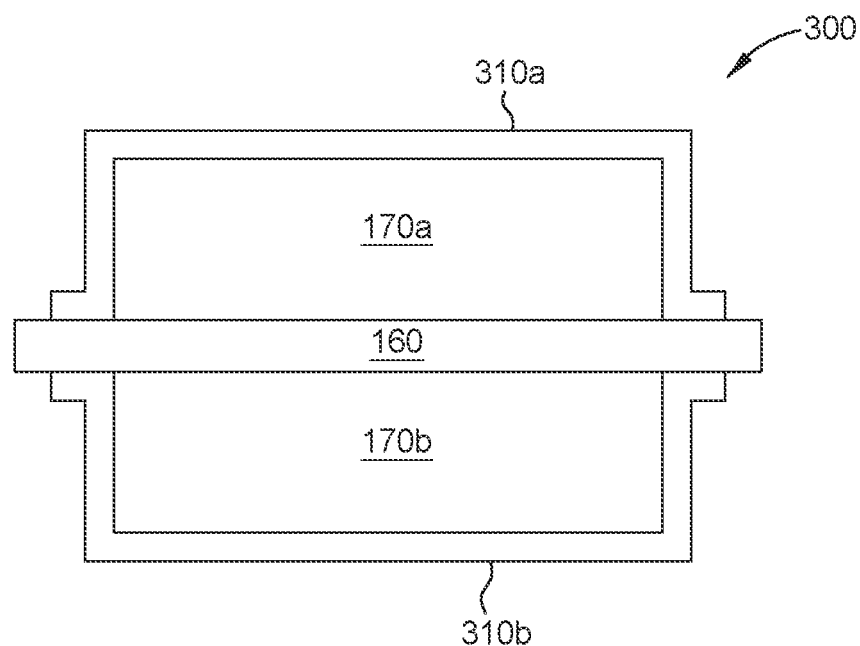
FIG. 3 illustrates a cross-sectional view of one implementation of a dual-sided anode electrode structure formed according to one or more implementations described herein.

FIG. 3 illustrates a cross-sectional view of one implementation of an anode electrode structure 300 formed according to implementations described herein. Note in FIG. 3 that the anode current collector 160 is shown to extend beyond the stack, although it is not necessary for the anode current collector 160 to extend beyond the stack, the portions extending beyond the stack may be used as tabs. Although the anode electrode structure 300 is depicted as a dual-sided electrode structure, it should be understood that the implementations described herein also apply to single-sided electrode structures.

The anode electrode structure 300 has the anode current collector 160 and anode films 170a, 170b (collectively 170) formed on opposing sides of the anode current collector 160. In some implementations, the anode film 170 is constructed from lithium metal, silicon, graphite, silicon-containing graphite, or a combination thereof. In one example, the anode film 170 is a lithium metal film. In some implementations, the anode film 170 has a thickness of 20 micrometers or less (e.g., from about 1 micrometer to about 20 micrometer). In some implementations, a protective film 310a, 310b (collectively 310) is formed on each of the anode films 170a, 170b. In some implementations, the protective film 310 comprises a mixed conduction material as described herein. In one example, the protective film 310 comprises lithiated-LTO (e.g., $Li_7Ti_5O_{12}$ $Li_9Ti_5O_{12}$), a lithium transition metal dichalcogenide, or a combination thereof. In some implementations, the protective film 310 has a thickness of 100 nanometers or less (e.g., from about 5 nanometers to 100 nanometers; from about 5 nanometers to about 40 nanometers; from about 10 nanometers to about 20 nanometers; or from about 50 nanometers to about 100 nanometers). In some implementations, as depicted in FIG. 3, the protective film 310 coats the exposed surfaces (e.g., top surface and sidewalls) of the anode film 170 extending to contact the anode current collector 160.

Figure 4:
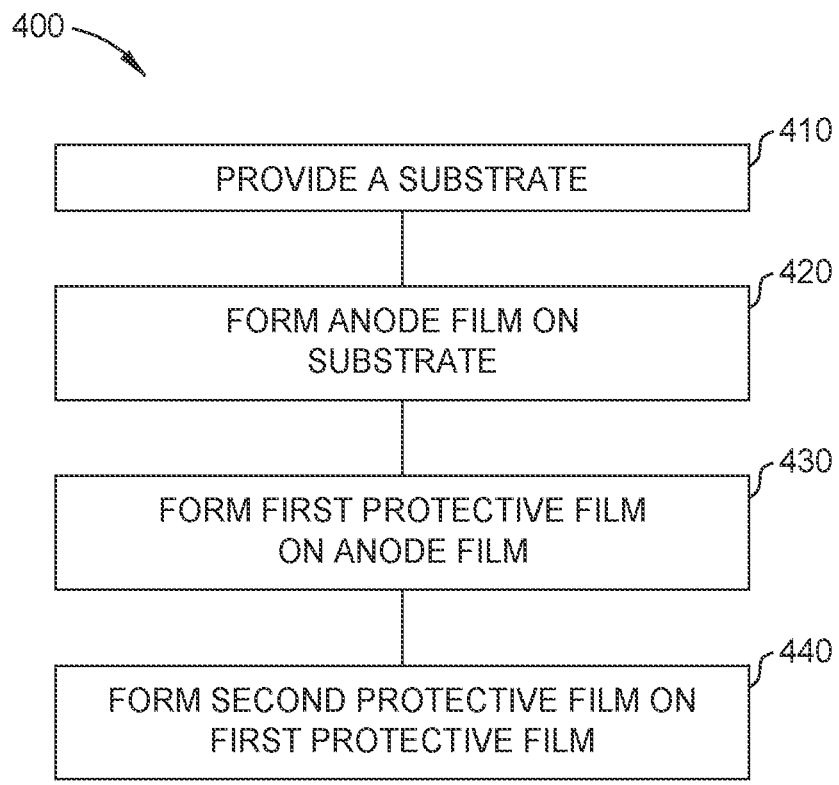
FIG. 4 illustrates a process flow chart summarizing one implementation of a method for forming an anode electrode structure according to one or more implementations described herein.
Figure 6:
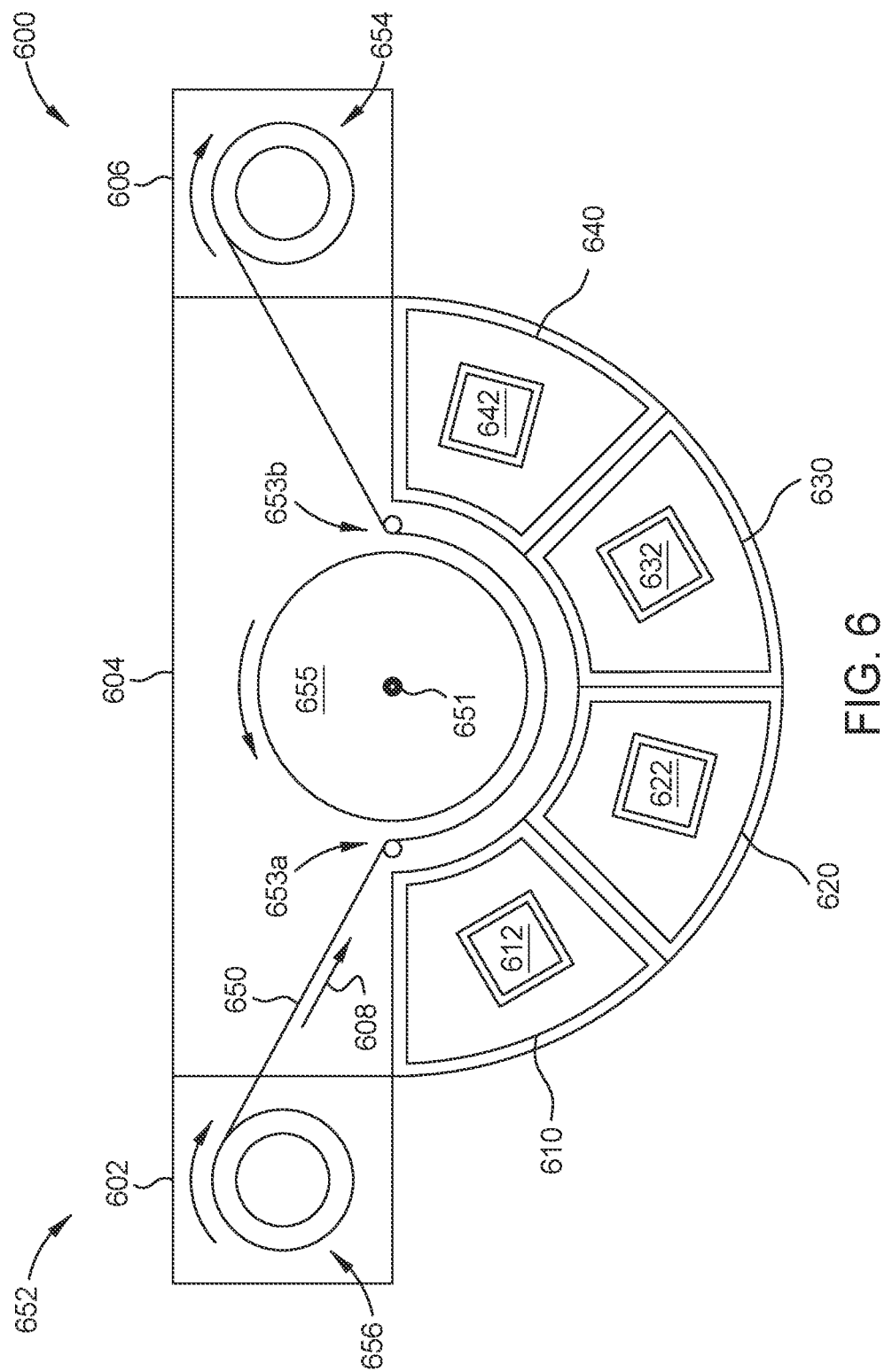
FIG. 6 illustrates a schematic view of an integrated processing tool for forming anode electrode structures according to one or more implementations described herein.

FIG. 4 illustrates a process flow chart summarizing one implementation of a method 400 for forming an anode electrode structure according to implementations described herein. The anode electrode structure may be the anode electrode structure 200 depicted in FIG. 2. At operation 410, a substrate is provided. In some implementations, the substrate is a continuous sheet of material 650 as shown in FIG. 6. In one example, the substrate is the anode current collector 160. Examples of metals that the substrate may be comprised of include aluminum (Al), copper (Cu), zinc (Zn), nickel (Ni), cobalt (Co), manganese (Mn), chromium (Cr), stainless steel, clad materials, alloys thereof, and a combination thereof. In one example, the substrate is copper material. In another example, the substrate is a stainless steel material. In some implementations, the substrate is perforated. Furthermore, the substrate may be of any form factor (e.g., metallic foil, sheet, or plate), shape and micro/macro structure.

In some implementations, the substrate is exposed to a pretreatment process, which includes at least one of a plasma treatment or corona discharge process to remove organic materials from the exposed surfaces of the current collector. The pretreatment process is performed prior to film deposition on the substrate.

At operation 420, an anode film is formed on the substrate. In some implementations, the anode film is the anode film 170 and the substrate is the anode current collector 160. In one example, the anode film is formed on a copper current collector. In another example, the anode film is already present on the substrate or "prefabricated." If an anode film is already present on the substrate, a lithium metal film may be formed on the anode film. If an anode film is not present, the anode metal film may be formed directly on the substrate. In some implementations, the anode film is constructed from lithium metal, silicon, graphite, silicon-containing graphite, or a combination thereof. In some implementations, the anode film has a thickness of 20 micrometers or less (e.g., from about 1 micrometer to about 20 micrometer).

In some implementations, the anode film is a lithium metal film. Any suitable lithium metal film deposition process for depositing thin films of lithium metal may be used to deposit the thin film of lithium metal. Deposition of the thin film of lithium metal may be by PVD processes, such as evaporation (e.g., thermal evaporation or e-beam), a slot-die process, a transfer process, or a three-dimensional lithium printing process. The chamber for depositing the thin film of lithium metal may include a PVD system, such as an electron-beam evaporator, a thermal evaporator, or a sputtering system, a thin film transfer system (including large area pattern printing systems such as gravure printing systems) or a slot-die deposition system.

At operation 430, a first protective film is formed on the anode film. With reference to FIG. 2, the first protective film may be the first protective film 210 and the anode film may be anode film 170. In some implementations, the first protective film comprises a mixed conduction material as described herein. In some implementations, the first protective film comprises lithiated-LTO (e.g., $Li_7Ti_5O_{12}$ $Li_9Ti_5O_{12}$), a lithium transition metal dichalcogenide, or a combination thereof. In some implementations, the first protective film is deposited by a PVD process, such as sputtering or evaporation (e.g., thermal evaporation or e-beam), a chemical vapor deposition process, an atomic layer deposition process, or a three-dimensional lithium printing process. In some implementations, the first protective film has a thickness of 500 nanometers or less (e.g., from about 1 nm to about 400 nm; from about 25 nm to about 300 nm; from about 50 nm to about 200 nm; from about 100 nm to about 150 nm; from about 10 nm to about 80 nm; or from about 30 to about 60 nanometers). In some implementations, the first protective film has a thickness of 100 nanometers or less (e.g., from about 5 nanometers to 100 nanometers; from about 10 nanometers to about 20 nanometers; or from about 50 nanometers to about 100 nanometers).

In some implementations, the first protective film comprises LTO (e.g., $Li_4Ti_5O_{12}$), which is deposited on the anode film via a PVD process. The LTO (e.g., $Li_4Ti_5O_{12}$) film may be exposed to a lithiation process to form the lithiated-LTO (e.g., $Li_7Ti_5O_{12}$ $Li_9Ti_5O_{12}$) film. In one example, the lithiation process occurs during the first cycle charge of the energy storage device of which the protected anode film is a part. In another example, the LTO (e.g., $Li_4Ti_5O_{12}$) film is deposited on a lithium metal film, the LTO (e.g., $Li_4Ti_5O_{12}$) film is reduced by interaction with the lithium metal film to form the lithiated-LTO (e.g., $Li_7Ti_5O_{12}$ $Li_9Ti_5O_{12}$) film.

In some implementations, the first protective film comprises a lithium transition metal dichalcogenide. In one example, the transition metal dichalcogenide is deposited on the anode film via a PVD process. In another example, the transition metal dichalcogenide is deposited on the anode film via a CVD or ALD process. In some implementations, the deposited transition metal dichalcogenide is exposed to a lithiation process to form the lithium transition metal dichalcogenide. In one example, the lithiation process occurs during the first cycle charge of the energy storage device of which the protected anode film is a part. In another example where the transition metal dichalcogenide is deposited on a lithium metal film, the transition metal dichalcogenide is reduced by interaction with the lithium metal film to form the lithium transition metal dichalcogenide.

In some implementations, the transition metal chalcogenide film is deposited using a PVD process having an RF power source coupled to a target. The target is typically composed of the materials of the transition metal chalcogenide film. For example, a titanium-sulfide alloy target, a tungsten-sulfide target, or a molybdenum-sulfide target. The plasma may be generated from a non-reactive gas such as argon (Ar), krypton (Kr), or nitrogen. In one example, a plasma is generated from argon gas having a flow rate within a range from about 30 standard cubic centimeters (sccm) to about 200 sccm, such as about 100 sccm to about 150 sccm. RF power may be applied to the target at a power level within a range from about 50 W to about 4,000 W, for example, about 1,000 W to about 3,000 W, such as about 2000 W. The deposition chamber may be pressurized from about 0.1 mTorr to about 500 mTorr. In one example, the deposition chamber is pressurized from about 0.1 mTorr to about 100 mTorr, for example, from about 10 mTorr to about 30 mTorr, such as 25 mTorr. The substrate may be electrically "floating" and have no bias. In one example, the deposition process of operation 430 is performed at a deposition temperature from about 50° C. to about 400° C., for example, from about 100° C. to about 200° C., such as about 120° C.

In some implementations, the plasma is generated using a DC power source coupled to the alloy target. The substrate may be electrically "floating" and have no bias. In one example, plasma is generated from an argon gas having a flow rate within a range from about 30 standard cubic centimeters (sccm) to about 200 sccm, such as about 100 sccm to about 150 sccm. In one example, a DC power is applied to the target at a power level within a range from about 50 W to about 5,000 W, from about 1000 W to about 3000 W, for example between about 1000 W to about 2000 W, such as about 2000 W. The deposition chamber may be pressurized from about 0.1 mTorr to about 500 mTorr. In one example, the deposition chamber is pressurized from about 0.1 mTorr to about 100 mTorr, for example, from about 10 mTorr to about 30 mTorr, such as 25 mTorr. In one example, the deposition process of operation 430 is performed at a deposition temperature from about 50° C. to about 400° C., for example, from about 100° C. to about 200° C., such as about 120° C.

In some implementations, the transition metal dichalcogenide is deposited using an ALD process. In one example, the ALD process comprises (a) flowing a first precursor gas comprising a transition metal into a processing region, (b) purging the processing region; (c) flowing a second precursor gas comprising a chalcogenide into the processing region to form the transition metal chalcogenide film; (d) purging the processing region; and (e) optionally repeating (a)-(d) until the transition metal dichalcogenide film achieves a targeted thickness. In one example where the transition metal dichalcogenide is $TiS_2$, the $TiS_2$ film is formed by (a) flowing $TiCl_4$ into a processing region, (b) purging the processing region, (c) flowing $H_2S$ into the processing region to form the $TiS_2$ film, (d) purging the processing region, and (e) repeating (a)-(d) until the $TiS_2$ film achieves a targeted thickness. In one example, (a)-(d) are performed in a different order, for example, (c) flowing $H_2S$ into the processing region to form the $TiS_2$ film, (b) purging the processing region, (a) flowing $TiCl_4$ into a processing region, (d) purging the processing region, and (e) repeating until the $TiS_2$ film achieves a targeted thickness.

At operation 440, a second protective film is formed on the first protective film. With reference to FIG. 2, the second protective film may be the second protective film 220 and the first protective film may be the first protective film 210. In some implementations, the second protective film comprises a mixed conduction material as described herein. In some implementations, the second protective film comprises lithiated-LTO (e.g., $Li_7Ti_5O_{12}$, $Li_9Ti_5O_{12}$), a lithium transition metal dichalcogenide, or a combination thereof. The second protective film is a different film than the first protective film formed at operation 430. In some implementations, the second protective film is deposited by a PVD process, such as sputtering or evaporation (e.g., thermal evaporation or e-beam), a chemical vapor deposition process, an atomic layer deposition process, or a three-dimensional lithium printing process. In some implementations, the second protective film has a thickness of 500 nanometers or less (e.g., from about 1 nm to about 400 nm; from about 25 nm to about 300 nm; from about 50 nm to about 200 nm; from about 100 nm to about 150 nm; from about 10 nm to about 80 nm; or from about 30 to about 60 nanometers). In other implementations, the second protective film has a thickness of 100 nanometers or less (e.g., from about 5 nanometers to 100 nanometers; from about 10 nanometers to about 20 nanometers; or from about 50 nanometers to about 100 nanometers).

In some implementations, the second protective film has a thickness in a range of 1 nanometer to 3,000 nanometers (e.g., in the range of 10 nanometers to 600 nanometers; in the range of 50 nanometers to 100 nanometers; in the range of 50 nanometers to 200 nanometers; in the range of 100 nanometers to 150 nanometers). In other implementations, the second protective film 220 has a thickness of 500 nanometers or less (e.g., from about 1 nm to about 400 nm; from about 25 nm to about 300 nm; from about 50 nm to about 200 nm; from about 100 nm to about 150 nm; from about 10 nm to about 80 nm; or from about 30 to about 60 nanometers). In other implementations, the second protective film 220 has a thickness of 100 nanometers or less (e.g., from about 5 nanometers to 100 nanometers; from about 10 nanometers to about 20 nanometers; or from about 50 nanometers to about 100 nanometers).

In one example, the first protective film formed during operation 430 comprises lithiated-LTO (e.g., $Li_7Ti_5O_{12}$, $Li_9Ti_5O_{12}$) and the second protective film formed during operation 440 comprises lithium-titanium-disulfide.

Figure 5:
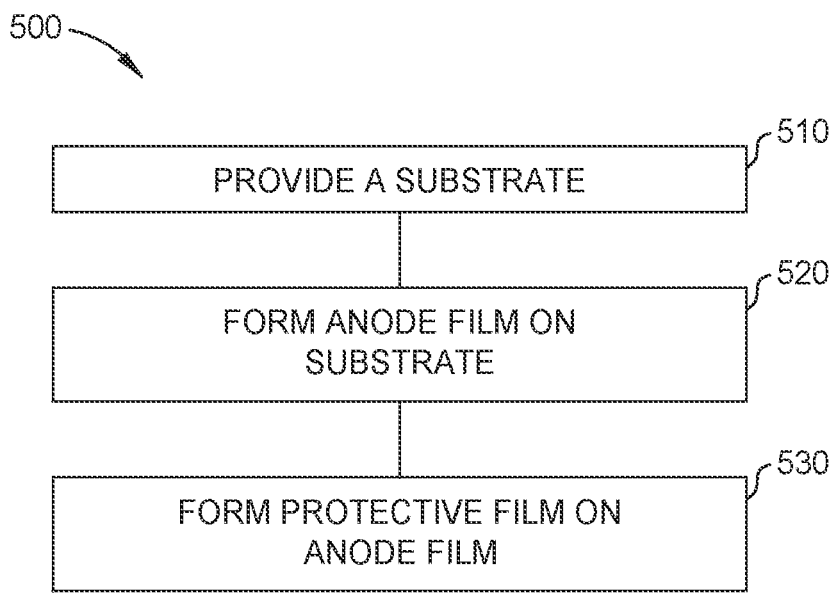
FIG. 5 illustrates a process flow chart summarizing one implementation of a method for forming an anode electrode structure according to one or more implementations described herein.

FIG. 5 illustrates a process flow chart summarizing one implementation of a method 500 for forming an anode electrode structure according to one or more implementations described herein. The anode electrode structure may be the anode electrode structure 300 depicted in FIG. 3. At operation 510, a substrate is provided. In some implementations, the substrate is a continuous sheet of material 650 as shown in FIG. 6. In one example, the substrate is the anode current collector 160. Examples of metals that the substrate may be comprised of include aluminum (Al), copper (Cu), zinc (Zn), nickel (Ni), cobalt (Co), manganese (Mn), chromium (Cr), stainless steel, clad materials, alloys thereof, and a combination thereof. In one example, the substrate is a copper material. In another example, the substrate is stainless steel. In some implementations, the substrate is perforated. Furthermore, the substrate may be of any form factor (e.g., metallic foil, sheet, or plate), shape and micro/macro structure.

In some implementations, the substrate is exposed to a pretreatment process, which includes at least one of a plasma treatment or corona discharge process to remove organic materials from the exposed surfaces of the current collector. The pretreatment process is performed prior to film deposition on the substrate.

At operation 520, an anode film is formed on the substrate. In some implementations, the anode film is the anode film 170 and the substrate is the anode current collector 160. In one example, the anode film is formed on a copper current collector. In another example, the anode film is already present on the substrate or "prefabricated." If an anode film is already present on the substrate, a lithium metal film may be formed on the anode film. If an anode film is not present, the anode metal film may be formed directly on the substrate. In some implementations, the anode film is constructed from lithium metal, silicon, graphite, silicon-containing graphite, or a combination thereof. In some implementations, the anode film has a thickness of 20 micrometers or less (e.g., from about 1 micrometer to about 20 micrometer). Any suitable method may be used to deposit the anode film.

At operation 530, a protective film is formed on the lithium metal film. With reference to FIG. 3, the protective film may be the protective film 310 and the anode film may be the anode film 170. In some implementations, the protective film comprises a mixed conduction material as described herein. In some implementations, the protective film comprises lithiated-LTO (e.g., $Li_7Ti_5O_{12}$, $Li_9Ti_5O_{12}$), a lithium transition metal dichalcogenide, or a combination thereof. In some implementations, the protective film is deposited by a PVD process, such as sputtering or evaporation (e.g., thermal evaporation or e-beam), a chemical vapor deposition process, an atomic layer deposition process, or a three-dimensional lithium printing process. In some implementations, the protective film has a thickness of 500 nanometers or less (e.g., from about 1 nm to about 400 nm; from about 25 nm to about 300 nm; from about 50 nm to about 200 nm; from about 100 nm to about 150 nm; from about 10 nm to about 80 nm; or from about 30 to about 60 nanometers). In other implementations, the protective film has a thickness of 100 nanometers or less (e.g., from about 5 nanometers to 100 nanometers; from about 10 nanometers to about 20 nanometers; or from about 50 nanometers to about 100 nanometers).

FIG. 6 illustrates a schematic view of a flexible substrate coating apparatus 600 for forming anode electrode structures according to implementations described herein. The flexible substrate coating apparatus 600 may be a SMARTWEB@, manufactured by Applied Materials, adapted for manufacturing lithium anode devices according to the implementations described herein. The flexible substrate coating apparatus 600 can be used for manufacturing lithium anodes, and particularly for protective film stacks for lithium anodes as described herein. The flexible substrate coating apparatus 600 is constituted as a roll-to-roll system including an unwinding module 602, a processing module 604 and a winding module 606. The processing module 604 comprises a plurality of processing modules or chambers 610, 620, 630 and 640 arranged in sequence, each configured to perform one processing operation to the continuous sheet of material 650 or web of material. In some implementations, as depicted in FIG. 6, the processing chambers 610-640 are radially disposed about a coating drum 655. Arrangements other than radial are contemplated. For example, in some implementations, the processing chambers is positioned in a linear configuration.

In some implementations, the processing chambers 610-640 are stand-alone modular processing chambers wherein each modular processing chamber is structurally separated from the other modular processing chambers. Therefore, each of the stand-alone modular processing chambers, can be arranged, rearranged, replaced, or maintained independently without affecting each other. Although four processing chambers 610-640 are shown, it should be understood that any number of processing chambers may be included in the flexible substrate coating apparatus 600.

The processing chambers 610-640 may include any suitable structure, configuration, arrangement, and/or components that enable the flexible substrate coating apparatus 600 to deposit a lithium anode device according to implementations of the present disclosure. For example, but not limited to, the processing chambers may include suitable deposition systems including coating sources, power sources, individual pressure controls, deposition control systems, and temperature control. The chambers may be provided with individual gas supplies. The chambers may be separated from each other for providing a good gas separation. The flexible substrate coating apparatus 600 is not limited in the number of deposition chambers. For example, the flexible substrate coating apparatus 600 may include 3, 6, 12, or more processing chambers.

The processing chambers 610-640 typically include one or more deposition units 612, 622, 632, and 642. The one or more deposition units may be selected from a CVD source, an ALD source, a PECVD source, and a PVD source. In some implementations, the one or more deposition units can include an evaporation source (thermal evaporation or e-beam), a sputter source, such as, a magnetron sputter source, DC sputter source, AC sputter source, pulsed sputter source, radio frequency (RF) sputtering, or middle frequency (MF) sputtering. For instance, MF sputtering with frequencies in the range of 5 kHz to 100 kHz, for example, 30 kHz to 50 kHz, can be provided. The one or more deposition units can include an evaporation source. The evaporation source may be a thermal evaporation source or an electron beam evaporation. In one example, the evaporation source is a lithium (Li) source. Further, the evaporation source may also be an alloy of two or more metals. The material to be deposited (e.g., lithium) may be provided in a crucible. The lithium is evaporated by thermal evaporation techniques or by electron-beam evaporation techniques.

Any of the processing chambers 610-640 of the flexible substrate coating apparatus 600 may be configured for performing deposition by sputtering, such as magnetron sputtering. As used herein, "magnetron sputtering" refers to sputtering performed using a magnet assembly, that is, a unit capable of a generating a magnetic field. The magnet assembly may include a permanent magnet. In one example, the permanent magnet is arranged within a rotatable target or coupled to a planar target in a manner such that the free electrons are trapped within the generated magnetic field generated below the rotatable target surface. In one example, the magnet assembly is coupled to a planar cathode.

Magnetron sputtering may also be realized by a double magnetron cathode, such as, but not limited to, a Twin-Mag™ cathode assembly. The cathodes in the processing chamber may be interchangeable. Thus, a modular design of the apparatus is provided which facilitates optimizing the apparatus for particular manufacturing processes. The number of cathodes in a chamber for sputtering deposition is chosen for optimizing an optimal productivity of the flexible substrate coating apparatus 600.

In some implementations, one or more of the processing chambers 610-640 are operable for performing sputtering without a magnetron assembly. One or more of the processing chambers 610-640 are operable for performing deposition by other methods, such as, but not limited to, chemical vapor deposition, atomic laser deposition or pulsed laser deposition. One or more of the processing chambers 610-640 are operable for performing a plasma treatment process, such as a plasma oxidation or plasma nitridation process.

In some implementations, the processing chambers 610-640 are operable to process both sides of the continuous sheet of material 650. Although the flexible substrate coating apparatus 600 is operable to process the continuous sheet of material 650, which is horizontally oriented, the flexible substrate coating apparatus 600 may be operable to process substrates positioned in different orientations, for example, the continuous sheet of material 650 may be vertically oriented. In some implementations, the continuous sheet of material 650 is a flexible conductive substrate. In some implementations, the continuous sheet of material 650 includes a conductive substrate with one or more layers formed thereon. In one example, the conductive substrate is a copper substrate.

The flexible substrate coating apparatus 600 further comprises a transfer mechanism 652. The transfer mechanism 652 may comprise any transfer mechanism capable of moving the continuous sheet of material 650 through the processing region of the processing chambers 610-640. The transfer mechanism 652 comprises a common transport architecture. In one example, the common transport architecture comprises a reel-to-reel system with a common take-up reel 654 positioned in the winding module 606, the coating drum 655 positioned in the processing module 604, and a feed reel 656 positioned in the unwinding module 602. The take-up reel 654, the coating drum 655, and the feed reel 656 may be individually heated. The take-up reel 654, the coating drum 655 and the feed reel 656 are individually heated using an internal heat source positioned within each reel or an external heat source. The common transport architecture may further comprise one or more auxiliary transfer reels 653*a*, 653*b* positioned between the take-up reel 654, the coating drum 655, and the feed reel 656. Although the flexible substrate coating apparatus 600 is depicted as having a single processing region, in some implementations, the flexible substrate coating apparatus 600 has separated or discrete processing regions for each individual processing chamber 610-640. For implementations having discrete processing regions, modules, or chambers, the common transport architecture may be a reel-to-reel system where each chamber or processing region has an individual take-up-reel and feed reel and one or more optional intermediate transfer reels positioned between the take-up reel and the feed reel.

The flexible substrate coating apparatus 600 comprises the feed reel 656 and the take-up reel 654 for moving the continuous sheet of material 650 through the different processing chambers 610-640. In one example, the first processing chamber 610 and the second processing chamber 620 are each operable to deposit a portion of an anode film (e.g., a lithium film, a graphite film, a silicon film, or a silicon-graphite film). The third processing chamber 630 is operable to deposit a first protective film (e.g., $Li_9Ti_5O_{12}$ or a lithium transition metal dichalcogenide). The fourth processing chamber 640 is operable to deposit a second protective film (e.g., $Li_9Ti_5O_{12}$ or a lithium transition metal dichalcogenide) over the first protective film.

In some implementations, processing chambers 610-620 are operable for depositing an anode film on the continuous sheet of material 650. Any suitable lithium deposition process for depositing thin anode films may be used to deposit the thin film of lithium metal. In one example, deposition of the anode film is by PVD processes, such as evaporation (e.g., thermal evaporation or e-beam), a CVD process, an ALD process, a slot-die process, a transfer process, a lamination process or a three-dimensional lithium printing process. The chambers for depositing the anode film of lithium metal may include a PVD system, such as a thermal evaporator, an electron-beam evaporator, a CVD system, an ALD system, a thin film transfer system (including large area pattern printing systems such as gravure printing systems), a lamination system, or a slot-die deposition system.

In some implementations, the third processing chamber 630 is configured for forming a lithiated-LTO film or a lithium transition metal dichalcogenide film on the anode film. The lithiated-LTO film or the lithium transition metal dichalcogenide film may be deposited using PVD techniques or ALD techniques as described herein. In some implementations, the fourth processing chamber 640 is configured for forming a lithium fluoride film on the chalcogenide film. The chambers for depositing the lithium fluoride film may include a PVD system, such as a thermal evaporator, an electron-beam evaporator, a CVD system, an ALD system, a thin film transfer system (including large area pattern printing systems such as gravure printing systems), a lamination system, or a slot-die deposition system.

In operation, the continuous sheet of material 650 is unwound from the feed reel 656 as indicated by the substrate movement direction shown by arrow 608. The continuous sheet of material 650 may be guided via one or more auxiliary transfer reels 653a, 653b. It is also possible that the continuous sheet of material 650 is guided by one or more substrate guide control units (not shown) that shall control the proper run of the flexible substrate, for instance, by fine adjusting the orientation of the flexible substrate.

After uncoiling from the feed reel 656 and running over the auxiliary transfer reel 653a, the continuous sheet of material 650 is then moved through the deposition areas provided at the coating drum 655 and corresponding to positions of the deposition units 612, 622, 632, and 642. During operation, the coating drum 655 rotates around axis 651 such that the flexible substrate moves in the direction of arrow 608.

Implementations:

Clause 1. A method, comprising forming a lithium metal film on a current collector, wherein the current collector comprises copper and/or stainless steel, and forming a protective film stack on the lithium metal film, comprising forming a first protective film on the lithium metal film, wherein the first protective film comprises $Li_9Ti_5O_{12}$.

Clause 2. The method of clause 1, wherein forming the protective film stack on the lithium metal film further comprises forming a second protective film on the first protective film, the second protective film comprising a lithium transition metal dichalcogenide.

Clause 3. The method of clause 2, wherein the lithium transition metal dichalcogenide comprises a transition metal dichalcogenide having the formula $MX_2$, wherein M is selected from Ti, Mo, or W and X is selected from S, Se, or Te.

Clause 4. The method of clause 3, wherein the transition metal dichalcogenide is selected from $TiS_2$, $MoS_2$, $WS_2$, or a combination thereof.

Clause 5. The method of any of clauses 1 to 4, forming the first protective film on the lithium metal film comprises depositing a $Li_4Ti_5O_{12}$ film on the lithium metal film via a physical vapor deposition (PVD) process.

Clause 6. The method of clause 5, further comprising exposing the $Li_4Ti_5O_{12}$ film to a lithiation process to form the $Li_9Ti_5O_{12}$ film.

Clause 7. The method of clause 5, wherein the $Li_4Ti_5O_{12}$ film is reduced to form the $Li_9Ti_5O_{12}$ film.

Clause 8. The method of any of clauses 2 to 7, wherein the lithium transition metal dichalcogenide is selected from lithium-titanium-disulfide, lithium-tungsten-disulfide, lithium-molybdenum-disulfide, or a combination thereof.

Clause 9. The method of any of clauses 2 to 8, wherein forming the lithium transition metal dichalcogenide comprises depositing a $TiS_2$ film on the $Li_4Ti_5O_{12}$ film or the $Li_9Ti_5O_{12}$ film via a chemical vapor deposition process and exposing the $TiS_2$ film to a lithiation process to form a $LiTiS_2$ film on the $Li_4Ti_5O_{12}$ film or the $Li_9Ti_5O_{12}$ film.

Clause 10. The method of clause 9, wherein depositing the $TiS_2$ film on the $Li_4Ti_5O_{12}$ film or the $Li_9Ti_5O_{12}$ film comprises (a) flowing $TiCl_4$ into a processing region, (b) purging the processing region, (c) flowing $H_2S$ into the processing region to form the $TiS_2$ film, (d) purging the processing region, and (e) repeating (a)-(d) until the $TiS_2$ film achieves a targeted thickness.

Clause 11. The method of any of clauses 1 to 10, wherein the first protective film has a thickness of 100 nanometers or less.

Clause 12. The method of clause 11, wherein the second protective film has a thickness of 100 nanometers or less.

Clause 13. An anode electrode structure, comprising a current collector comprising copper and/or stainless steel, a lithium metal film formed on the current collector, and a protective film stack formed on the lithium metal film, comprising a first protective film formed on the lithium metal film, wherein the first protective film, wherein the first protective film comprises $Li_9Ti_5O_{12}$.

Clause 14. The anode electrode structure of clause 13, wherein the protective film stack further comprises a second protective film formed on the first protective film, the second protective film comprising a lithium transition metal dichalcogenide.

Clause 15. The anode electrode structure of clause 14, wherein the lithium transition metal dichalcogenide comprises a transition metal dichalcogenide having the formula $MX_2$, wherein M is selected from Ti, Mo, or W and X is selected from S, Se, or Te.

Clause 16. The anode electrode structure of clause 15, wherein the transition metal dichalcogenide is selected from $TiS_2$, $MoS_2$, $WS_2$, or a combination thereof.

Clause 17. The anode electrode structure of any of clauses 13 to 16, wherein the first protective film has a thickness of 100 nanometers or less.

Clause 18. The anode electrode structure of any of clauses 14 to 17, wherein the second protective film has a thickness of 100 nanometer or less.

Clause 19. An energy storage device, comprising the anode electrode structure of any of clauses 13 to 18, a cathode electrode structure, and a solid electrolyte film formed between the anode electrode structure and the cathode electrode structure.

Clause 20. The energy storage device of clause 19, wherein the solid electrolyte film is comprised of one or more of: LiPON, doped variants of either crystalline or amorphous phases of $Li_7La_3Zr_2O_{12}$, doped anti-perovskite compositions, argyrodite compositions, lithium-sulfur-phosphorous materials, $Li_2S-P_2S_5$, $Li_{10}GeP_2S_{12}$, and $Li_3PS_4$, lithium phosphate glasses, $(1-x)LiI-(x)Li_4SnS_4$, $xLiI-(1-x)Li_4SnS_4$, mixed sulfide and oxide electrolytes (crystalline LLZO, amorphous $(1-x)LiI-(x)Li_4SnS_4$ mixture, amorphous $xLiI-(1-x)Li_4SnS_4$), $Li_3S(BF_4)_{0.5}Cl_{0.5}$, $Li_4Ti_5O_{12}$, lithium doped lanthanum titanate (LATP), $Li_{2+2x}Zn_{1-x}GeO_4$, $LiTi_2(PO_4)_3$, $LiHf_2(PO_4)_3$, $LiGe_2(PO_4)_3$, and a combination thereof.

Clause 21. A method, comprising forming a lithium metal film on a current collector, wherein the current collector comprises copper and/or stainless steel; and forming a protective film on the lithium metal film, comprising a lithium transition metal dichalcogenide.

Clause 22. The method of clause 21, wherein the lithium transition metal dichalcogenide comprises a transition metal dichalcogenide having the formula $MX_2$, wherein M is selected from Ti, Mo, or W and X is selected from S, Se, or Te.

Clause 23. The method of clause 22, wherein the transition metal dichalcogenide is selected from $TiS_2$, $MoS_2$, $WS_2$, or a combination thereof.

Clause 24. The method of any of clauses 21 to 23, wherein the lithium transition metal dichalcogenide is selected from lithium-titanium-disulfide, lithium-tungsten-disulfide, lithium-molybdenum-disulfide, or a combination thereof.

Clause 25. The method of any of clauses 21 to 24, wherein forming the protective film comprises depositing a $TiS_2$ film on the lithium metal film, and exposing the $TiS_2$ film to a lithiation process to form the lithium-titanium-disulfide film.

Clause 26. The method of clause 25, wherein depositing the $TiS_2$ film on the lithium metal film comprises (a) flowing $TiCl_4$ into a processing region, (b) purging the processing region, (c) flowing $H_2S$ into the processing region to form the $TiS_2$ film, (d) purging the processing region, and (e) repeating (a)-(d) until the $TiS_2$ film achieves a targeted thickness.

Clause 27. The method of any of clauses 21 to 26, wherein the protective film has a thickness of 100 nanometers or less.

Clause 28. An anode electrode structure, comprising a current collector comprising copper and/or stainless steel, a lithium metal film formed on the current collector, and a protective film formed on the lithium metal film, comprising a first protective film formed on the lithium metal film, wherein the first protective film comprises a lithium transition metal dichalcogenide.

Clause 29. The anode electrode structure of clause 28, wherein the lithium transition metal dichalcogenide comprises a transition metal dichalcogenide having the formula $MX_2$, wherein M is selected from Ti, Mo, or W and X is selected from S, Se, or Te.

Clause 30. The anode electrode structure of clause 29, wherein the transition metal dichalcogenide is selected from $TiS_2$, $MoS_2$, $WS_2$, or a combination thereof.

Clause 31. The anode electrode structure of any of clauses 28 to 30, wherein the lithium transition metal dichalcogenide is selected from lithium-titanium-disulfide, lithium-tungsten-disulfide, lithium-molybdenum-disulfide, or a combination thereof.

Clause 32. The anode electrode structure of any of clauses 28 to 31, wherein the protective film has a thickness of 100 nanometers or less.

Clause 33. An energy storage device, comprising the anode electrode structure of any of clauses 28 to 32, a cathode electrode structure, and a solid electrolyte film formed between the anode electrode structure and the cathode electrode structure.

Clause 34. The energy storage device of clause 33, wherein the solid electrolyte film is comprised of one or more of: LiPON, doped variants of either crystalline or amorphous phases of $Li_7La_3Zr_2O_{12}$, doped anti-perovskite compositions, argyrodite compositions, lithium-sulfur-phosphorous materials, $Li_2S$—$P_2S_5$, $Li_{10}GeP_2S_{12}$, and $Li_3PS_4$, lithium phosphate glasses, $(1-x)LiI-(x)Li_4SnS_4$, $xLiI-(1-x)Li_4SnS_4$, mixed sulfide and oxide electrolytes (crystalline LLZO, amorphous $(1-x)LiI-(x)Li_4SnS_4$ mixture, amorphous $xLiI-(1-x)Li_4SnS_4$), $Li_3S(BF_4)_{0.5}Cl_{0.5}$, $Li_4Ti_5O_{12}$, lithium doped lanthanum titanate (LATP), $Li_{2+2x}Zn_{1-x}GeO_4$, $LiTi_2(PO_4)_3$, $LiHf_2(PO_4)_3$, $LiGe_2(PO_4)_3$, and a combination thereof.

Clause 35. A method, comprising forming a graphite-containing film on a current collector, wherein the current collector comprises copper and/or stainless steel and forming a protective film stack on the graphite-containing film, comprising forming a first protective film on the graphite-containing film, wherein the first protective film comprises $Li_9Ti_5O_{12}$.

Clause 36. The method of clause 35, wherein forming the protective film stack on the graphite-containing film further comprises forming a second protective film on the first protective film, the second protective film comprising a lithium transition metal dichalcogenide.

Clause 37. The method of clause 36, wherein the lithium transition metal dichalcogenide comprises a transition metal dichalcogenide having the formula $MX_2$, wherein M is selected from Ti, Mo, or W and X is selected from S, Se, or Te.

Clause 38. The method of clause 37, wherein the transition metal dichalcogenide is selected from $TiS_2$, $MoS_2$, $WS_2$, or a combination thereof.

Clause 39. The method of any of clauses 35 to 38, wherein forming the first protective film on the graphite-containing film comprises depositing a $Li_4Ti_5O_{12}$ film on the graphite-containing film via a physical vapor deposition (PVD) process.

Clause 40. The method of clause 39, further comprising exposing the $Li_4Ti_5O_{12}$ film to a lithiation process to form the $Li_9Ti_5O_{12}$ film.

Clause 41. The method of any of clauses 35 to 40, wherein the lithium transition metal dichalcogenide is selected from lithium-titanium-disulfide, lithium-tungsten-disulfide, lithium-molybdenum-disulfide, or a combination thereof.

Clause 42. The method of any of clauses 35 to 41, wherein forming the lithium transition metal dichalcogenide comprises depositing a $TiS_2$ film on the $Li_4Ti_5O_{12}$ film or the $Li_9Ti_5O_{12}$ film via a chemical vapor deposition process and exposing the $TiS_2$ film to a lithiation process to form a $LiTiS_2$ film on the $Li_4Ti_5O_{12}$ film or the $Li_9Ti_5O_{12}$ film.

Clause 43. The method of clause 42, wherein depositing the $TiS_2$ film on the $Li_4Ti_5O_{12}$ film or the $Li_9Ti_5O_{12}$ film comprises (a) flowing $TiCl_4$ into a processing region, (b) purging the processing region, (c) flowing $H_2S$ into the processing region to form the $TiS_2$ film, (d) purging the processing region, and (e) repeating (a)-(d) until the $TiS_2$ film achieves a targeted thickness.

Clause 44. The method of any of clauses 35 to 43, wherein first protective film has a thickness of 100 nanometers or less.

Clause 45. The method of any of clauses 36 to 43, wherein the second protective film has a thickness of 100 nanometer or less.

Clause 46. The method of any of clauses 35 to 45, wherein the graphite-containing film further comprises silicon.

Clause 47. An anode electrode structure, comprising a current collector comprising copper and/or stainless steel, a graphite-containing film formed on the current collector, and a protective film stack formed on the graphite-containing film, comprising a first protective film formed on the graphite-containing film, wherein the first protective film comprises $Li_9Ti_5O_{12}$.

Clause 48. The anode electrode structure of clause 47, wherein the protective film stack further comprises a second protective film formed on the first protective film, the second protective film comprising a lithium transition metal dichalcogenide.

Clause 49. The anode electrode structure of clause 48, wherein the lithium transition metal dichalcogenide comprises a transition metal dichalcogenide having the formula $MX_2$, wherein M is selected from Ti, Mo, or W and X is selected from S, Se, or Te.

Clause 50. The anode electrode structure of clause 49, wherein the transition metal dichalcogenide is selected from $TiS_2$, $MoS_2$, $WS_2$, or a combination thereof.

Clause 51. The anode electrode structure of any of clauses 47 to 50, wherein the first protective film has a thickness of 100 nanometers or less.

Clause 52. The anode electrode structure of any of clauses 48 to 51, wherein the second protective film has a thickness of 100 nanometers or less.

Clause 53. The anode electrode structure of any of clauses 47 to 52, wherein the graphite-containing film further comprises silicon.

Clause 54. An energy storage device, comprising the anode electrode structure of any of clauses 47 to 53, a cathode electrode structure, and a solid electrolyte film formed between the anode electrode structure and the cathode electrode structure.

Clause 55. The energy storage device of clause 54, wherein the solid electrolyte film is comprised of one or more of: LiPON, doped variants of either crystalline or amorphous phases of $Li_7La_3Zr_2O_{12}$, doped anti-perovskite compositions, argyrodite compositions, lithium-sulfur-phosphorous materials, $Li_2S$—$P_2S_5$, $Li_{10}GeP_2S_{12}$, and $Li_3PS_4$, lithium phosphate glasses, $(1-x)LiI-(x)Li_4SnS_4$, $xLiI-(1-x)Li_4SnS_4$, mixed sulfide and oxide electrolytes (crystalline LLZO, amorphous $(1-x)LiI-(x)Li_4SnS_4$ mixture, amorphous $xLiI-(1-x)Li_4SnS_4$), $Li_3S(BF_4)_{0.5}Cl_{0.5}$, $Li_4Ti_5O_{12}$, lithium doped lanthanum titanate (LATP), $Li_{2+2x}Zn_{1-x}GeO_4$, $LiTi_2(PO_4)_3$, $LiHf_2(PO_4)_3$, $LiGe_2(PO_4)_3$, and a combination thereof.

Clause 56. A method, comprising forming a graphite-containing film on a current collector, wherein the current collector comprises copper and/or stainless steel and forming a protective film on the graphite-containing film, comprising a lithium transition metal dichalcogenide.

Clause 57. The method of clause 56, wherein the lithium transition metal dichalcogenide comprises a transition metal dichalcogenide having the formula $MX_2$, wherein M is selected from Ti, Mo, or W and X is selected from S, Se, or Te.

Clause 58. The method of clause 57, wherein the transition metal dichalcogenide is selected from $TiS_2$, $MoS_2$, $WS_2$, or a combination thereof.

Clause 59. The method of any of clauses 56 to 58, wherein the lithium transition metal dichalcogenide is selected from lithium-titanium-disulfide, lithium-tungsten-disulfide, lithium-molybdenum-disulfide, or a combination thereof.

Clause 60. The method of any of clauses 56 to 59, wherein forming the protective film comprises depositing a $TiS_2$ film on the graphite-containing film, and exposing the $TiS_2$ film to a lithiation process to form the lithium-titanium-disulfide film.

Clause 61. The method of clause 60, wherein depositing the $TiS_2$ film on the graphite-containing film comprises (a) flowing $TiCl_4$ into a processing region, (b) purging the processing region, (c) flowing $H_2S$ into the processing region to form the $TiS_2$ film, (d) purging the processing region, and (e) repeating (a)-(d) until the $TiS_2$ film achieves a targeted thickness.

Clause 62. The method of any of clauses 56 to 61, wherein the protective film has a thickness of 100 nanometers or less.

Clause 63. The method of any of clauses 56 to 62, wherein the graphite-containing film further comprises silicon.

Clause 64. An anode electrode structure, comprising a current collector comprising copper and/or stainless steel, a graphite-containing film formed on the current collector, and a protective film formed on the graphite-containing film, wherein the protective film comprises a lithium transition metal dichalcogenide.

Clause 65. The anode electrode structure of clause 64, wherein the lithium transition metal dichalcogenide comprises a transition metal dichalcogenide having the formula $MX_2$, wherein M is selected from Ti, Mo, or W and X is selected from S, Se, or Te.

Clause 66. The anode electrode structure of clause 65, wherein the transition metal dichalcogenide is selected from $TiS_2$, $MoS_2$, $WS_2$, or a combination thereof.

Clause 67. The anode electrode structure of any of clauses 64 to 66, wherein the lithium transition metal dichalcogenide is selected from lithium-titanium-disulfide, lithium-tungsten-disulfide, lithium-molybdenum-disulfide, or a combination thereof.

Clause 68. The anode electrode structure of any of clauses 64 to 67, wherein the protective film has a thickness of 100 nanometers or less.

69. The anode electrode structure of any of clauses 64 to 68, wherein the graphite-containing film further comprises silicon.

Clause 70. An energy storage device, comprising the anode electrode structure of any of clauses 64 to 69, a cathode electrode structure, and a solid electrolyte film formed between the anode electrode structure and the cathode electrode structure.

Clause 71. The energy storage device of clause 70, wherein the solid electrolyte film is comprised of one or more of: LiPON, doped variants of either crystalline or amorphous phases of $Li_7La_3Zr_2O_{12}$, doped anti-perovskite compositions, argyrodite compositions, lithium-sulfur-phosphorous materials, $Li_2S$—$P_2S_5$, $Li_{10}GeP_2S_{12}$, and $Li_3PS_4$, lithium phosphate glasses, $(1-x)LiI-(x)Li_4SnS_4$, $xLiI-(1-x)Li_4SnS_4$, mixed sulfide and oxide electrolytes (crystalline LLZO, amorphous $(1-x)LiI-(x)Li_4SnS_4$ mixture, amorphous $xLiI-(1-x)Li_4SnS_4$), $Li_3S(BF_4)_{0.5}Cl_{0.5}$, $Li_4Ti_5O_{12}$, lithium doped lanthanum titanate (LATP), $Li_{2+2x}Zn_{1-x}GeO_4$, $LiTi_2(PO_4)_3$, $LiHf_2(PO_4)_3$, $LiGe_2(PO_4)_3$, and a combination thereof.

Clause 72. A method, comprising forming a lithium metal film on a current collector, wherein the current collector comprises copper and/or stainless steel, and forming a protective film stack on the lithium metal film, comprising forming a first protective film on the lithium metal film, wherein the first protective film comprises lithiated lithium-titanium-oxide (LTO).

Clause 73. The method of clause 72, wherein forming the protective film stack on the lithium metal film further comprises forming a second protective film on the first protective film, the second protective film comprising a lithium transition metal dichalcogenide.

Clause 74. The method of clause 73, wherein the lithium transition metal dichalcogenide comprises a transition metal dichalcogenide having the formula $MX_2$, wherein M is selected from Ti, Mo, or W and X is selected from S, Se, or Te.

Clause 75. The method of clause 74, wherein the transition metal dichalcogenide is selected from $TiS_2$, $MoS_2$, $WS_2$, or a combination thereof.

Clause 76. The method of any of clauses 72 to 75, forming the first protective film on the lithium metal film comprises depositing a LTO film on the lithium metal film via a physical vapor deposition (PVD) process.

Clause 77. The method of clause 76, further comprising exposing the LTO film to a lithiation process to form the lithiated-LTO film.

Clause 78. The method of clause 76, wherein the LTO film is reduced to form the lithiated-LTO film.

Clause 79. The method of any of clauses 73 to 78, wherein the lithium transition metal dichalcogenide is selected from lithium-titanium-disulfide, lithium-tungsten-disulfide, lithium-molybdenum-disulfide, or a combination thereof.

Clause 80. The method of any of clauses 73 to 79, wherein forming the lithium transition metal dichalcogenide comprises depositing a $TiS_2$ film on the LTO film or the lithiated-LTO film via a chemical vapor deposition process and exposing the $TiS_2$ film to a lithiation process to form a $LiTiS_2$ film on the LTO film or the lithiated-LTO film.

Clause 81. The method of clause 80, wherein depositing the $TiS_2$ film on the LTO film or the lithiated-LTO film comprises (a) flowing $TiCl_4$ into a processing region, (b) purging the processing region, (c) flowing $H_2S$ into the processing region to form the $TiS_2$ film, (d) purging the processing region, and (e) repeating (a)-(d) until the $TiS_2$ film achieves a targeted thickness.

Clause 82. The method of any of clauses 72 to 81, wherein the first protective film has a thickness of 100 nanometers or less.

Clause 83. The method of clause 82, wherein the second protective film has a thickness of 100 nanometers or less.

Clause 84. An anode electrode structure, comprising a current collector comprising copper and/or stainless steel, a lithium metal film formed on the current collector, and a protective film stack formed on the lithium metal film, comprising a first protective film formed on the lithium metal film, wherein the first protective film comprises lithiated-LTO.

Clause 85. The anode electrode structure of clause 84, wherein the protective film stack further comprises a second protective film formed on the first protective film, the second protective film comprising a lithium transition metal dichalcogenide.

Clause 86. The anode electrode structure of clause 85, wherein the lithium transition metal dichalcogenide comprises a transition metal dichalcogenide having the formula $MX_2$, wherein M is selected from Ti, Mo, or W and X is selected from S, Se, or Te.

Clause 87. The anode electrode structure of clause 86, wherein the transition metal dichalcogenide is selected from $TiS_2$, $MoS_2$, $WS_2$, or a combination thereof.

Clause 88. The anode electrode structure of any of clauses 84 to 87, wherein the first protective film has a thickness of 100 nanometers or less.

Clause 89. The anode electrode structure of any of clauses 85 to 88, wherein the second protective film has a thickness of 100 nanometer or less.

Clause 90. An energy storage device, comprising the anode electrode structure of any of clauses 84 to 89, a cathode electrode structure, and a solid electrolyte film formed between the anode electrode structure and the cathode electrode structure.

Clause 91. The energy storage device of clause 90, wherein the solid electrolyte film is comprised of one or more of: LiPON, doped variants of either crystalline or amorphous phases of $Li_7La_3Zr_2O_{12}$, doped anti-perovskite compositions, argyrodite compositions, lithium-sulfur-phosphorous materials, $Li_2S$—$P_2S_5$, $Li_{10}GeP_2S_{12}$, and $Li_3PS_4$, lithium phosphate glasses, $(1-x)LiI-(x)Li_4SnS_4$, $xLiI-(1-x)Li_4SnS_4$, mixed sulfide and oxide electrolytes (crystalline LLZO, amorphous $(1-x)LiI-(x)Li_4SnS_4$ mixture, amorphous $xLiI-(1-x)Li_4SnS_4$), $Li_3S(BF_4)_{0.5}Cl_{0.5}$, $Li_4Ti_5O_{12}$, lithium doped lanthanum titanate (LATP), $Li_{2+2x}Zn_{1-x}GeO_4$, $LiTi_2(PO_4)_3$, $LiHf_2(PO_4)_3$, $LiGe_2(PO_4)_3$, and a combination thereof.

Clause 92. A method, comprising forming a graphite-containing film on a current collector, wherein the current collector comprises copper and/or stainless steel, and forming a protective film stack on the graphite-containing film, comprising forming a first protective film on the graphite-containing film, wherein the first protective film comprises lithiated lithium-titanium-oxide (LTO).

Clause 93. The method of clause 92, wherein forming the protective film stack on the graphite-containing film further comprises forming a second protective film on the first protective film, the second protective film comprising a lithium transition metal dichalcogenide.

Clause 94. The method of clause 93, wherein the lithium transition metal dichalcogenide comprises a transition metal dichalcogenide having the formula $MX_2$, wherein M is selected from Ti, Mo, or W and X is selected from S, Se, or Te.

Clause 95. The method of clause 94, wherein the transition metal dichalcogenide is selected from $TiS_2$, $MoS_2$, $WS_2$, or a combination thereof.

Clause 96. The method of any of clauses 92 to 95, wherein forming the first protective film on the graphite-containing film comprises depositing a LTO film on the graphite-containing film via a physical vapor deposition (PVD) process.

Clause 97. The method of clause 96, further comprising exposing the LTO film to a lithiation process to form the lithiated-LTO film.

Clause 98. The method of any of clauses 94 to 97, wherein the lithium transition metal dichalcogenide is selected from lithium-titanium-disulfide, lithium-tungsten-disulfide, lithium-molybdenum-disulfide, or a combination thereof.

Clause 99. The method of any of clauses 95 to 98, wherein forming the lithium transition metal dichalcogenide comprises depositing a $TiS_2$ film on the LTO film or the lithiated-LTO film via a chemical vapor deposition process, and exposing the $TiS_2$ film to a lithiation process to form a $LiTiS_2$ film on the LTO film or the lithiated-LTO film.

Clause 100. The method of clause 99, wherein depositing the $TiS_2$ film on the LTO film or the lithiated-LTO film comprises (a) flowing $TiCl_4$ into a processing region, (b) purging the processing region (c) flowing $H_2S$ into the processing region to form the $TiS_2$ film, (d) purging the processing region, and (e) repeating (a)-(d) until the $TiS_2$ film achieves a targeted thickness.

Clause 101. The method of any of clauses 92 to 100, wherein first protective film has a thickness of 100 nanometers or less.

Clause 102. The method of any of clauses 93 to 100, wherein the second protective film has a thickness of 100 nanometer or less.

Clause 103. The method of any of clauses 92 to 102, wherein the graphite-containing film further comprises silicon.

Clause 104. An anode electrode structure, comprising a current collector comprising copper and/or stainless steel, a graphite-containing film formed on the current collector, and a protective film stack formed on the graphite-containing film, comprising a first protective film formed on the graphite-containing film, wherein the first protective film comprises lithiated-LTO.

Clause 105. The anode electrode structure of clause 104, wherein the protective film stack further comprises a second protective film formed on the first protective film, the second protective film comprising a lithium transition metal dichalcogenide.

Clause 106. The anode electrode structure of clause 105, wherein the lithium transition metal dichalcogenide comprises a transition metal dichalcogenide having the formula $MX_2$, wherein M is selected from Ti, Mo, or W and X is selected from S, Se, or Te.

Clause 107. The anode electrode structure of clause 106, wherein the transition metal dichalcogenide is selected from $TiS_2$, $MoS_2$, $WS_2$, or a combination thereof.

Clause 108. The anode electrode structure of any of clauses 104 to 107, wherein the first protective film has a thickness of 100 nanometers or less.

Clause 109. The anode electrode structure of any of clauses 104 to 108, wherein the second protective film has a thickness of 100 nanometers or less.

Clause 110. The anode electrode structure of any of clauses 104 to 109, wherein the graphite-containing film further comprises silicon.

Clause 111. An energy storage device, comprising the anode electrode structure of any of clauses 104 to 110, a cathode electrode structure, and a solid electrolyte film formed between the anode electrode structure and the cathode electrode structure.

Clause 112. The energy storage device of clause 111, wherein the solid electrolyte film is comprised of one or more of: LiPON, doped variants of either crystalline or amorphous phases of $Li_7La_3Zr_2O_{12}$, doped anti-perovskite compositions, argyrodite compositions, lithium-sulfur-phosphorous materials, $Li_2S$—$P_2S_5$, $Li_{10}GeP_2S_{12}$, and $Li_3PS_4$, lithium phosphate glasses, $(1-x)LiI-(x)Li_4SnS_4$, $xLiI-(1-x)Li_4SnS_4$, mixed sulfide and oxide electrolytes (crystalline LLZO, amorphous $(1-x)LiI-(x)Li_4SnS_4$ mixture, amorphous $xLiI-(1-x)Li_4SnS_4$), $Li_3S(BF_4)_{0.5}Cl_{0.5}$, $Li_4Ti_5O_{12}$, lithium doped lanthanum titanate (LATP), $Li_{2+2x}Zn_{1-x}GeO_4$, $LiTi_2(PO_4)_3$, $LiHf_2(PO_4)_3$, $LiGe_2(PO_4)_3$, and a combination thereof.

In summary, some of the benefits of the present disclosure include the efficient integration and deposition of protective or interfacial films on anode films, such as lithium films, graphite films, or silicon-graphite films, to enhance energy density, cycle life and safety. In some implementations, the protective films are down selected from higher voltage materials (e.g., materials having a voltage greater than 1.5 volts). In some implementations, the protective films include $Li_9Ti_5O_{12}$ and/or lithium transition metal dichalcogenides. In some implementations, the protective films are formed by depositing films comprising $Li_4Ti_5O_{12}$ or transition metal dichalcogenides (e.g., $WS_2$, $TiS_2$, and $MoS_2$). Upon interaction with lithium, both the $Li_4Ti_5O_{12}$ and the transition metal dichalcogenides are respectively reduced to $Li_9Ti_5O_{12}$ and/or lithium transition metal dichalcogenides both of which offer fast lithium-ion transport, while reducing SEI formation with liquid electrolyte. The aforementioned protective films also experience minimal volume change upon lithiation, which prevents dimensional changes and/or cracking at the protective interface of the protective film. Additionally, $Li_9Ti_5O_{12}$ is compatible with the oxide family of solid state electrolytes and lithium-titanium-disulfide is compatible with sulfide solid state electrolytes for future integration.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there may be additional elements other than the listed elements.

While the foregoing is directed to implementations of the present disclosure, other and further implementations of the disclosure may be devised without departing from the basic scope thereof, and the scope thereof is determined by the claims that follow.

The invention claimed is:

1. A method, comprising:
forming a lithium metal film on a current collector, wherein the current collector comprises copper and/or stainless steel;
forming a protective film stack on the lithium metal film, comprising:
forming a first protective film on the lithium metal film, wherein the first protective film comprises a $Li_9Ti_5O_{12}$ film, and wherein forming the first protective film on the lithium metal film further comprises:
depositing a $Li_4Ti_5O_{12}$ film on the lithium metal film via a physical vapor deposition (PVD) process; and
exposing the $Li_4Ti_5O_{12}$ film to a lithiation process to form the $Li_9Ti_5O_{12}$ film; and
forming a second protective film on the first protective film, the second protective film comprising a lithium transition metal dichalcogenide, and wherein forming the lithium transition metal dichalcogenide comprises:
depositing a $TiS_2$ film on the $Li_4Ti_5O_{12}$ film or the $Li_9Ti_5O_{12}$ film via a chemical vapor deposition process; and
exposing the $TiS_2$ film to the lithiation process to form a $LiTiS_2$ film on the $Li_9Ti_5O_{12}$ film or the $Li_9Ti_5O_{12}$ film.

2. The method of claim 1, wherein depositing the $TiS_2$ film on the $Li_4Ti_5O_{12}$ film or the $Li_9Ti_5O_{12}$ film comprises:
(a) flowing $TiCl_4$ into a processing region;
(b) purging the processing region;
(c) flowing $H_2S$ into the processing region to form the $TiS_2$ film;
(d) purging the processing region; and
(e) repeating (a)-(d) until the $TiS_2$ film achieves a targeted thickness.

3. The method of claim 2, wherein the first protective film has a thickness of 100 nanometers or less, and wherein the second protective film has a thickness of 100 nanometers or less.

4. A method, comprising:
forming a lithium metal film on a current collector comprising one or more metals;
forming a protective film stack on the lithium metal film, comprising:
forming a first protective film on the lithium metal film, wherein the first protective film comprises a $Li_9Ti_5O_{12}$ film, and wherein forming the first protective film on the lithium metal film further comprises:
depositing a $Li_4Ti_5O_{12}$ film on the lithium metal film via a physical vapor deposition (PVD) process; and
exposing the $Li_4Ti_5O_{12}$ film to a lithiation process to form the $Li_9Ti_5O_{12}$ film; and
forming a second protective film on the first protective film, the second protective film comprising a lithium transition metal dichalcogenide, and wherein forming the lithium transition metal dichalcogenide comprises:

depositing a $TiS_2$ film on the $Li_4Ti_5O_{12}$ film or the $Li_9Ti_5O_{12}$ film via a chemical vapor deposition process; and exposing the $TiS_2$ film to the lithiation process to form a $LiTiS_2$ film on the $Li_4Ti_5O_{12}$ film or the $Li_9Ti_5O_{12}$ film.

5. The method of claim 4, wherein the one or more metals comprise aluminum, copper, zinc, nickel, cobalt, manganese, chromium, stainless steel, clad materials, alloys thereof, or any combination thereof.

6. A method, comprising:

forming a lithium metal film on a current collector, wherein the current collector comprises copper and/or stainless steel; and forming a protective film stack on the lithium metal film, comprising:

forming a first protective film on the lithium metal film, wherein the first protective film comprises a $Li_9Ti_5O_{12}$ film, and wherein forming the first protective film on the lithium metal film further comprises:

depositing a $Li_4Ti_5O_{12}$ film on the lithium metal film via a physical vapor deposition (PVD) process; and reducing the $Li_4Ti_5O_{12}$ film to form the $Li_9Ti_5O_{12}$ film; and forming a second protective film on the first protective film, the second protective film comprising a lithium transition metal dichalcogenide, and wherein forming the lithium transition metal dichalcogenide comprises:

depositing a $TiS_2$ film on the $Li_4Ti_5O_{12}$ film or the $Li_9Ti_5O_{12}$ film via a chemical vapor deposition process; and exposing the $TiS_2$ film to the lithiation process to form a $LiTiS_2$ film on the $Li_4Ti_5O_{12}$ film or the $Li_9Ti_5O_{12}$ film.

* * * * *